(12) United States Patent
Propst

(10) Patent No.: US 9,027,300 B2
(45) Date of Patent: May 12, 2015

(54) BUILDING PANEL SYSTEM

(71) Applicant: Propst Family Limited Partnership, Phoenix, AZ (US)

(72) Inventor: John Eugene Propst, Phoenix, AZ (US)

(73) Assignee: Propst Family Limited Partnership, Phoenix, AZ (US)

( * ) Notice: Subject to any disclaimer, the term of this patent is extended or adjusted under 35 U.S.C. 154(b) by 0 days.

(21) Appl. No.: 13/954,339

(22) Filed: Jul. 30, 2013

(65) Prior Publication Data
US 2013/0309454 A1     Nov. 21, 2013

Related U.S. Application Data

(63) Continuation-in-part of application No. PCT/US2012/048065, filed on Jul. 25, 2012, which is a continuation-in-part of application No. 13/431,053, filed on Mar. 27, 2012, now Pat. No. 8,695,299, which
(Continued)

(51) Int. Cl.
*E04B 1/14*     (2006.01)
*E04C 2/288*     (2006.01)
(Continued)

(52) U.S. Cl.
CPC ............... *E04B 1/14* (2013.01); *E04C 2/2885* (2013.01); *E04C 2/288* (2013.01); *E04B 1/762* (2013.01);
(Continued)

(58) Field of Classification Search
CPC ........... E04C 1/40; E04C 2/049; E04C 2/288; E04C 2/2885; E04C 2/205; E04C 2/246; E04C 2/296; E04B 1/14; E04B 1/762

USPC ............... 52/309.11, 309.12, 309.16, 309.17, 52/344, 351, 362, 363, 443, 444, 454
See application file for complete search history.

(56) References Cited

U.S. PATENT DOCUMENTS 1,681,311 A    4/1928   Techmer
1,693,742 A    12/1928   Bemis
(Continued)

FOREIGN PATENT DOCUMENTS

DE     102005049428 A1 *   6/2007  ............... E04C 2/52
WO     2012001198 A2     1/2012

OTHER PUBLICATIONS

Wind-Lock, Wind-Devil 2 Fastening System, http://www.wind-lock.com/cat-25-1-5/Fasteners.htm, Leesport, PA, 1 page retrieved Jan. 6, 2010.
(Continued)

*Primary Examiner* — Robert Canfield
(74) *Attorney, Agent, or Firm* — Schmeiser, Olsen & Watts LLP

(57) ABSTRACT

A building panel structure is disclosed, in which building panels are used to form a structure. The building panel includes a core and a coating covering a portion of the core. In some embodiments the core consists of a frame and at least one insulating structural block. The insulating structural blocks can be encapsulated polystyrene (EPS) foam blocks. In some embodiments the coating includes ceramic material. In some embodiments the coating includes a scratch layer and a main brown layer. In some embodiments the scratch layer and the main brown layer are interdigitated to increase the strength and durability of the coating and the building panel. In some embodiments the building panel includes a construction board formed separate from the core. The construction board is formed of coating mixtures and applied to the core after the coating mixtures have cured.

14 Claims, 23 Drawing Sheets

Related U.S. Application Data is a continuation-in-part of application No. 13/362,947, filed on Jan. 31, 2012, now Pat. No. 8,458,983, which is a continuation of application No. 13/110,706, filed on May 18, 2011, now Pat. No. 8,127,509, which is a continuation of application No. 12/844,163, filed on Jul. 27, 2010, now Pat. No. 7,984,594.

(60) Provisional application No. 61/740,110, filed on Dec. 20, 2012, provisional application No. 61/296,616, filed on Jan. 20, 2010, provisional application No. 61/511,891, filed on Jul. 26, 2011, provisional application No. 61/560,897, filed on Nov. 17, 2011.

(51) Int. Cl.
| | | |
|---|---|---|
| *E04B 1/76* | (2006.01) | |
| *E04C 1/40* | (2006.01) | |
| *E04C 2/04* | (2006.01) | |
| *B32B 17/02* | (2006.01) | |
| *E04C 2/296* | (2006.01) | |
| *B32B 5/02* | (2006.01) | |
| *B32B 13/04* | (2006.01) | |
| *B32B 3/30* | (2006.01) | |

(52) U.S. Cl.
CPC . *E04C 1/40* (2013.01); *E04C 2/049* (2013.01); *B32B 17/02* (2013.01); *E04C 2/296* (2013.01); *B32B 2262/101* (2013.01); *B32B 2266/0228* (2013.01); *B32B 5/02* (2013.01); *B32B 13/04* (2013.01); *B32B 3/30* (2013.01); *B32B 2260/021* (2013.01); *B32B 2260/046* (2013.01); *B32B 2419/00* (2013.01); *B32B 2607/00* (2013.01)

(56) References Cited

U.S. PATENT DOCUMENTS

| | | | | |
|---|---|---|---|---|
| 2,046,071 | A | | 6/1936 | Harding et al. |
| 2,091,552 | A | | 8/1937 | Macauley |
| 2,109,719 | A | | 3/1938 | Brusse |
| 2,176,938 | A | | 10/1939 | Troy |
| 2,395,186 | A | * | 2/1946 | Jones ............... 15/235.6 |
| 2,902,853 | A | | 9/1959 | Lofstrom |
| 3,044,919 | A | | 7/1962 | Stoneburner |
| 3,145,502 | A | | 8/1964 | Rubenstein |
| 3,284,980 | A | | 11/1966 | Dinkel |
| 3,492,196 | A | | 1/1970 | Moore |
| 3,662,507 | A | | 5/1972 | Espeland |
| 3,762,935 | A | * | 10/1973 | Leach ............... 501/84 |
| 3,835,608 | A | | 9/1974 | Johnson |
| 3,982,368 | A | | 9/1976 | Perrin |
| 4,044,520 | A | | 8/1977 | Barrows |
| 4,049,874 | A | | 9/1977 | Aoyama et al. |
| 4,113,913 | A | | 9/1978 | Smiley |
| 4,164,933 | A | | 8/1979 | Alosi |
| 4,186,536 | A | | 2/1980 | Piazza |
| 4,191,001 | A | | 3/1980 | Lheureux |
| 4,193,240 | A | | 3/1980 | Odoerfer |
| 4,204,520 | A | | 5/1980 | Rosenberg |
| 4,237,861 | A | | 12/1980 | Fayard et al. |
| 4,288,962 | A | | 9/1981 | Kavanaugh |
| 4,314,431 | A | | 2/1982 | Rabassa |
| 4,342,180 | A | | 8/1982 | Gibson et al. |
| 4,349,398 | A | | 9/1982 | Kearns et al. |
| 4,489,530 | A | | 12/1984 | Chang |
| 4,525,965 | A | | 7/1985 | Woelfel |
| 4,558,552 | A | | 12/1985 | Reitter, II |
| 4,578,915 | A | | 4/1986 | Schneller |
| 4,646,498 | A | | 3/1987 | Schneller et al. |
| 4,653,243 | A | | 3/1987 | Burkett |
| 4,669,240 | A | | 6/1987 | Amormino |
| 4,774,794 | A | | 10/1988 | Grieb |
| 4,841,705 | A | * | 6/1989 | Fuhrer ............... 52/410 |
| 4,852,316 | A | | 8/1989 | Webb |
| 4,875,322 | A | | 10/1989 | Rozzi |
| 4,876,151 | A | | 10/1989 | Eichen |
| 4,882,888 | A | | 11/1989 | Moore |
| 4,946,512 | A | | 8/1990 | Fukuroi et al. |
| 4,958,399 | A | * | 9/1990 | Toal et al. ............... 15/245.1 |
| 5,003,742 | A | * | 4/1991 | Dettbarn ............... 52/282.3 |
| 5,127,204 | A | | 7/1992 | Braun |
| 5,129,628 | A | * | 7/1992 | Vesper ............... 256/31 |
| 5,184,808 | A | * | 2/1993 | Vesper ............... 256/31 |
| 5,231,813 | A | | 8/1993 | Drawdy |
| 5,246,640 | A | | 9/1993 | Bryant |
| 5,248,549 | A | | 9/1993 | Silva et al. |
| 5,335,472 | A | | 8/1994 | Phillips |
| 5,353,560 | A | | 10/1994 | Heydon |
| 5,404,685 | A | | 4/1995 | Collins |
| 5,410,852 | A | | 5/1995 | Edgar et al. |
| 5,473,849 | A | | 12/1995 | Jones, Jr. et al. |
| 5,502,940 | A | | 4/1996 | Fifield |
| 5,735,090 | A | | 4/1998 | Papke |
| 5,740,643 | A | * | 4/1998 | Huntley ............... 52/265 |
| 5,758,461 | A | | 6/1998 | McManus |
| 5,758,463 | A | | 6/1998 | Mancini, Jr. |
| 5,771,649 | A | | 6/1998 | Zweig |
| 5,826,388 | A | | 10/1998 | Irving |
| 5,842,276 | A | | 12/1998 | Asher et al. |
| 5,916,392 | A | | 6/1999 | Ghanbari |
| 5,921,046 | A | | 7/1999 | Hammond, Jr. |
| 5,966,885 | A | | 10/1999 | Chatelain |
| 5,979,131 | A | | 11/1999 | Remmele et al. |
| 6,006,480 | A | | 12/1999 | Rook |
| 6,044,603 | A | | 4/2000 | Bader |
| 6,112,489 | A | | 9/2000 | Zweig |
| 6,119,422 | A | | 9/2000 | Clear et al. |
| 6,119,432 | A | | 9/2000 | Niemann |
| 6,263,628 | B1 | | 7/2001 | Griffin |
| 6,314,695 | B1 | | 11/2001 | Belleau |
| 6,314,704 | B1 | | 11/2001 | Bryant |
| 6,355,333 | B1 | | 3/2002 | Waggoner et al. |
| 6,401,413 | B1 | | 6/2002 | Niemann |
| 6,434,900 | B1 | | 8/2002 | Masters |
| 6,438,923 | B2 | | 8/2002 | Miller |
| 6,526,714 | B1 | | 3/2003 | Billings et al. |
| 6,622,452 | B2 | | 9/2003 | Alvaro |
| 6,698,150 | B1 | | 3/2004 | DiLorenzo |
| 6,715,249 | B2 | | 4/2004 | Rusek, Jr. et al. |
| 6,745,531 | B1 | | 6/2004 | Egan |
| 6,807,786 | B1 | | 10/2004 | Peck |
| 6,898,908 | B2 | | 5/2005 | Messenger et al. |
| 6,918,218 | B2 | | 7/2005 | Greenway |
| 6,931,809 | B1 | | 8/2005 | Brown et al. |
| 7,036,284 | B1 | | 5/2006 | Larson |
| 7,100,336 | B2 | | 9/2006 | Messenger et al. |
| 7,194,845 | B2 | | 3/2007 | Belleau |
| 7,204,065 | B2 | | 4/2007 | Naji |
| 7,254,925 | B2 | | 8/2007 | Stefanutti et al. |
| 7,337,591 | B2 | | 3/2008 | Molina |
| D577,971 | S | * | 10/2008 | Hughett ............... D8/45 |
| 7,610,911 | B2 | | 11/2009 | Neumann et al. |
| 7,681,368 | B1 | | 3/2010 | Rubio |
| 7,709,091 | B2 | | 5/2010 | Villani et al. |
| 7,882,666 | B2 | | 2/2011 | Karalic |
| 7,902,092 | B2 | | 3/2011 | Egan et al. |
| 7,939,747 | B2 | | 5/2011 | Stimson et al. |
| 7,984,594 | B1 | | 7/2011 | Propst |
| 8,051,611 | B2 | * | 11/2011 | Serino et al. ............... 52/169.14 |
| 8,127,509 | B2 | | 3/2012 | Propst |
| 8,286,297 | B1 | * | 10/2012 | Murray ............... 15/235.4 |
| 8,458,983 | B2 | | 6/2013 | Propst |
| 2002/0139075 | A1 | | 10/2002 | Shubow et al. |
| 2002/0157336 | A1 | | 10/2002 | Worrell et al. |
| 2004/0016194 | A1 | * | 1/2004 | Stefanutti et al. ............... 52/425 |
| 2004/0043682 | A1 | | 3/2004 | Taylor et al. |
| 2004/0074184 | A1 | * | 4/2004 | Naji ............... 52/344 |
| 2005/0053723 | A1 | * | 3/2005 | Brzoska ............... 427/356 |
| 2005/0144901 | A1 | | 7/2005 | Egan et al. |
| 2008/0200086 | A1 | | 8/2008 | Porter et al. |
| 2008/0257222 | A1 | | 10/2008 | Wallner |

(56) References Cited

U.S. PATENT DOCUMENTS

| | | | |
|---|---|---|---|
| 2009/0011212 A1 | 1/2009 | Dubey et al. | |
| 2009/0031656 A1 | 2/2009 | Hunt-Hansen et al. | |
| 2009/0044476 A1* | 2/2009 | Agneloni | 52/443 |
| 2009/0239430 A1 | 9/2009 | Egan et al. | |
| 2010/0071292 A1 | 3/2010 | Futterman | |
| 2010/0307091 A1 | 12/2010 | Diaz, Jr. et al. | |
| 2011/0036035 A1 | 2/2011 | Dettbarn et al. | |
| 2011/0154764 A1* | 6/2011 | Wang et al. | 52/309.1 |
| 2011/0220093 A1 | 9/2011 | Fernandez-Fernandez | |
| 2011/0281066 A1 | 11/2011 | Andrews et al. | |
| 2012/0207975 A1 | 8/2012 | Andrews et al. | |
| 2012/0276369 A1* | 11/2012 | Jing et al. | 428/331 |
| 2014/0115804 A1* | 5/2014 | Propst | 15/235.6 |
| 2014/0174647 A1* | 6/2014 | Ciuperca | 156/253 |

OTHER PUBLICATIONS

Dryvit Systems, Inc., What are Dryvit Outsulation Systems, http://www.dryvit.com/systems.asp?country_id=1, West Warwick, RI, 1 page retrieved Jan. 6, 2010.

Propst, J., Composite Building and Panel Systems, Patent Cooperation Treaty Application Serial No. PCT/US 11/20563, filed Jan. 7, 2011, International Search Report and Written Opinion, dated Jun. 9, 2011.

Primus, Arctic-Modified Adhesive and Base Coat, DS414, 3 pages, from Dryvit Systems, Inc. 1991.

Webster's Third New International Dictionary definition of "stucco", 1 page, 1993.

Finestone Pebbletex Finishes, Product Bulletin 1017861, BASF The Chemical Company, 4 pages, May 2008.

Panacor Sistemas De Construcción, Panel 3D Panacor Technical Manual, Document was issued to representative of Propst Family Limited Partnership LLC, the applicant for patent application Costa Rica 2012-0377, on Jan. 14, 2013, 18 pages, Costa Rica.

Panacor Sistemas De Construcción, Panel-I Panacor Technical Manual, Document was issued to representative of Propst Family Limited Partnership LLC, the applicant for patent application Costa Rica 2012-0377, on Jan. 14, 2013, 36 pages, Costa Rica.

Panacor Sistemas De Construcción, Panel-I Panacor Information Brochure, Document was issued to representative of Propst Family Limited Partnership LLC, the applicant for patent application Costa Rica 2012-0377, on Jan. 14, 2013, 9 pages, Costa Rica.

Propst, J., Building Panel System, Patent Cooperation Treaty Application Serial No. PCT/US 12/48065, filed Jul. 25, 2012, International Search Report and Written Opinion, dated Mar. 29, 2013.

Hawley's Condensed Chemical Dictionary, Fourteenth Edition, (C) 2001, definition of "ceramic" page 229.

* cited by examiner

BUILDING PANEL SYSTEM

CROSS REFERENCE TO RELATED APPLICATIONS

This application is a continuation-in-part of U.S. patent application Ser. No. 13/431,053 to John Eugene Propst entitled "Building Panel System," filed Mar. 27, 2012, which is included entirely herein by reference. This application also claims priority to U.S. patent application Ser. No. 61/740,110 to John Eugene Propst entitled "Building Panel System", filed Dec. 20, 2012, which is included entirely herein by reference. This application is also a continuation-in-part of International patent application number PCT/US2012/048065 filed Jul. 25, 2012, which is included entirely herein by reference. U.S. patent application Ser. No. 13/431,053 is a continuation-in-part of U.S. patent application Ser. No. 13/362,947 to John Eugene Propst, filed Jan. 31, 2012 and now issued as U.S. Pat. No. 8,458,983, which is a continuation of U.S. patent application Ser. No. 13/110,706 to John Eugene Propst, filed May 18, 2011 and now issued as U.S. Pat. No. 8,127,509, which is a continuation of U.S. patent application Ser. No. 12/844,163 to John Eugene Propst, filed Jul. 27, 2010 and now issued as U.S. Pat. No. 7,984,594, which is a non-provisional of U.S. patent application Ser. No. 61/296,616, to John Eugene Propst, filed Jan. 20, 2010 and entitled "Layered Building Panel System". U.S. patent application Ser. No. 13/431,053 also claims priority to U.S. patent application Ser. No. 61/511,891 to John Eugene Propst entitled "Composite Building and Panel Systems", filed Jul. 26, 2011, and to U.S. patent application Ser. No. 61/560,897 to John Eugene Propst entitled "Composite Panel Coating Systems", filed Nov. 17, 2011, which are included entirely herein by reference.

BACKGROUND OF THE INVENTION

1. Technical Field

This invention relates generally to materials for constructing buildings and structures and more specifically to coated building panels, composite and layered construction boards, and building panel coating mixtures.

2. State of the Art

Buildings have historically been constructed of brick, cement block, wood frame and, more recently, steel frame and stucco. The material and techniques used in constructing buildings is evolving in an effort to reduce cost, increase energy efficiency, reduce the amount of wood usage in buildings, and to reduce material waste. Cement block and brick construction requires a large amount of manpower to create a building, which raises the cost of the building. Wood has long been a staple material in building construction, but recently there is a desire to preserve forest resources. Wood is inherently more susceptible to damage from inclement weather, moisture, mold, fire, and insect infestation. Also, when wood is used to create a building there can be a large amount of waste. This is because standard sized boards are sent to the construction site, which must be cut and assembled at the building site into a building. The labor involved in cutting lumber to size results in high labor costs and a large amount of lumber wasted from boards cut to size.

It is also desirable to increase the energy efficiency of buildings in order to reduce the energy costs during the lifetime of the building. Cement block, brick, and wood frame and stucco construction do not provide the high level of energy efficiency that can be obtained from newer materials.

Foam blocks have become a popular alternative and are environmentally sustainable as compared to traditional wood, cement block, and brick construction materials. Foam block systems are lightweight, can be molded or formed into any needed shape, result in a thermally efficient building construction, and require less skilled manpower to form into a building structure. Other benefits include, but are not limited to, a resistance to moisture, mold, fire and insect damage. The foam blocks are constructed using materials which are recyclable and renewable, provide good insulating qualities, and are often themselves made from recycled materials. Alternatively, construction blocks can also be made from other environmentally friendly materials such as straw, wood fibers, paper, and glass, for example.

One problem with some of the new building materials such as foam block is that the structural strength of a building element that is made with foam blocks may not be as high as when wood, brick or cement block are used to form the building element. This can be particularly important in areas where buildings are required to withstand high winds or earthquakes. There is a need for a building panel system which minimizes construction time, uses environmentally friendly materials, and results in a building with high structural strength and structural integrity.

DISCLOSURE OF THE INVENTION

This invention relates generally to materials for constructing buildings and structures and more specifically to building panels, composite construction boards, and coating mixtures for building panels. Disclosed is a composite construction board that includes a first layer and a second layer. The first layer comprises a mixture of cement, aggregate, and acrylic bonder. In some embodiments the first layer also comprises a reinforcing mesh structure. The second layer comprises a mixture of cement, acrylic bonder, and a reinforcing mesh structure. The reinforcing mesh structure is embedded in the second layer when the second layer is still wet. In some embodiments the second layer further comprises aggregate. In some embodiments the second layer further comprises ceramic. In some embodiments the aggregate in the second layer comprises ceramic. In some embodiments the second layer further comprises reinforcing strands. In some embodiments the reinforcing mesh structure is a fiberglass mesh. In some embodiments the reinforcing strands are fiberglass strands. In some embodiments the second layer is coupled to an outer surface of the first layer. In some embodiments an inner surface of the first layer is coupled to a construction film. In some embodiments the construction film is a moisture barrier. In some embodiments the construction film is an electronic mesh structure.

Disclosed is a building panel that includes a building panel core and a coating covering a portion of the building panel core. The building panel core comprises a frame and at least one insulating structural block. The coating comprises ceramic. In some embodiments the coating includes a scratch layer and a main brown layer. In some embodiments the scratch layer is a mixture that includes acrylic bonder and cement. In some embodiments the main brown layer is a cementitious mixture that includes the ceramic material. A cementitious mixture that includes ceramic material is a mixture that includes cement and the ceramic material. In some embodiments the scratch layer includes a fiberglass mesh. In some embodiments the scratch layer includes a reinforcing mesh that is a material other than fiberglass, such as cotton, metal, plastic, lead, ceramic, or other type of material or fibers. In some embodiments the main brown layer includes a fiberglass mesh. In some embodiments the main brown layer includes a reinforcing mesh that is a material other than fiberglass, such as cotton, metal, plastic, lead, ceramic, or other type of material or fibers. In some embodiments the scratch layer includes acrylic bonder. In some embodiments the scratch layer includes aggregate. In some embodiments the main brown layer includes acrylic bonder. In some embodiments the scratch layer is formed to include a plurality of crests in the scratch layer, where an average half-width of the plurality of crests is between about 1/8 inch and about 3/4 inch after the scratch layer is dry.

Disclosed is a building panel that includes a building panel core and a coating covering a portion of the core. In some embodiments the core includes a front surface, a rear surface, and one or more than one side. In some embodiments the core includes a frame and one or more than one insulating structural block. In some embodiments the frame is embedded in the one or more than one insulating structural block. The coating includes a scratch layer and a main brown layer. In some embodiments the scratch layer is a cementitious mixture. In some embodiments the main brown layer is a cementitious mixture. In some embodiments the scratch layer and the main brown layer are interdigitated, where each of a plurality of crests in the inner scratch layer reside in a corresponding one of a plurality of grooves in the outer main brown layer. In some embodiments the scratch layer includes a plurality of crests and valleys. In some embodiments the main brown layer covers the plurality of crests and valleys. In some embodiments the plurality of crests has an average half-width of between 1/16 inch and 3/4 inch once the scratch layer dries. In some embodiments the plurality of crests has an average half-width of between 1/8 inch and 5/8 inch once the scratch layer dries (cures). In some embodiments the plurality of crests have an average period of between 1/4 inch and 1 1/2 inch once the scratch layer dries. In some embodiments the plurality of crests has an average half-width of between 1/2 inch and 1 1/4 inch once the scratch layer dries.

In some embodiments the outer main brown layer includes a fiberglass mesh. In some embodiments the outer main brown layer includes cement, aggregate, and fiberglass mesh. In some embodiments the outer main brown layer includes cement, aggregate, and acrylic bonder. In some embodiments the outer main brown layer includes cement, aggregate, acrylic bonder, and ceramic. In some embodiments the outer main brown layer includes cement, aggregate, and fiberglass strands. In some embodiments the outer main brown layer includes cement, aggregate, acrylic bonder, and fiberglass mesh.

In some embodiments the outer main brown layer includes cement, aggregate, acrylic bonder, fiberglass strands, and fiberglass mesh. In some embodiments the scratch layer consists of at least two layers. In some embodiments the scratch layer includes a first scratch layer A of cement, aggregate, and acrylic bonder, and a second scratch layer B which includes cement, aggregate, acrylic bonder, fiberglass strands, and fiberglass mesh. In some embodiments the inner scratch layer includes a wire mesh. In some embodiments the outer main brown layer aggregate includes perlite. In some embodiments the outer main brown layer aggregate includes sand. In some embodiments the insulating structural block is composed of expanded polystyrene foam. In some embodiments the scratch layer includes a first scratch layer A and a second scratch layer B. In some embodiments the first scratch layer A is a base coat formed of a cementitious mixture with a fiberglass mesh embedded in the cementitious mixture while it is still wet. In some embodiments the second scratch coat B is a cementitious mixture.

The foregoing and other features and advantages of the present invention will be apparent from the following more detailed description of the particular embodiments of the invention, and as illustrated in the accompanying drawings.

DETAILED DESCRIPTION OF EMBODIMENTS OF THE INVENTION

As discussed above, embodiments of the disclosed invention relate to materials for constructing buildings and structures and more specifically to building panels, composite construction boards, and coating mixtures for building panels.

The use of environmentally friendly, insulating, lightweight block materials for use as the walls, roofs, floors and other structures in buildings is increasing in popularity. The blocks of material are being used to replace concrete blocks and insulated wood and stucco walls. These blocks are structural elements which provide insulation properties and a shaped mass which defines the shape of the structure to be built. Expanded polystyrene (EPS) foam blocks are a popular material, but other materials such as straw, plastic, and recycled elements are also being used to create these insulating structural blocks. These new building materials use less wood, decrease construction waste, often use recycled materials, and create a building which is more energy efficient than standard wood frame and plaster construction buildings. Insulating structural blocks such as EPS foam blocks are often lightweight and can be molded or shaped easily to create any desired shape. These new block materials, including EPS foam blocks, sometimes do not possess the necessary structural strength for specific building structures. In these cases it is necessary to add structural elements to the building panels made from insulating structural block materials. Disclosed herein are building panels and methods of creating building panels using insulating structural blocks, frames, and coatings over the blocks and frames to create structurally strong structures and building panels, while still retaining the lightweight, environmentally friendly, and energy efficient characteristics of the insulating structural blocks.

Disclosed herein are coating mixtures and coating structures for applying over the building panel core to create the composite building panel. Also disclosed are construction boards, which comprise the composite building panel coatings when they are formed separate from the building panel core and applied as a construction board to building panel cores or other surfaces.

Figure 1:
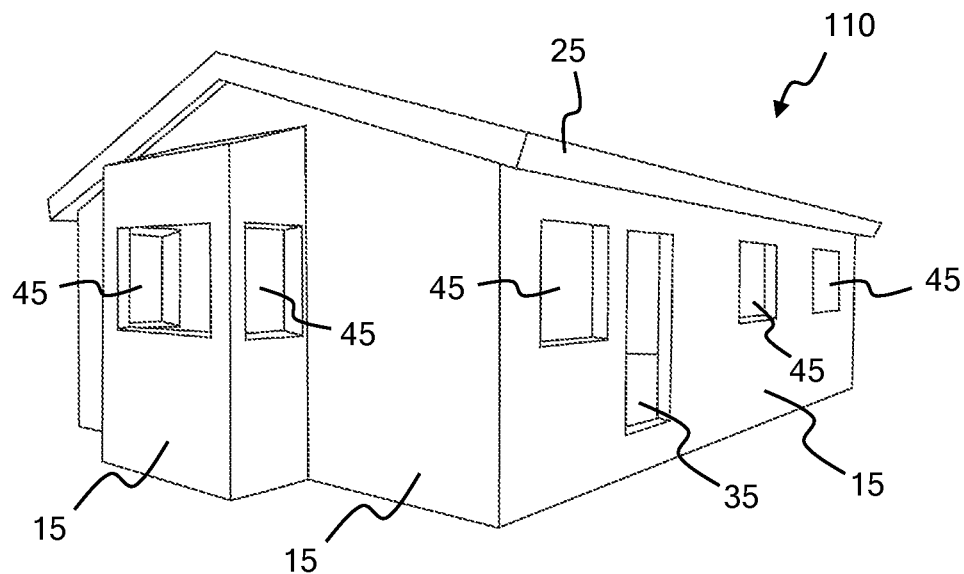
FIG. 1 is a perspective view of an embodiment of structure 110 according to the invention.
Figure 2:
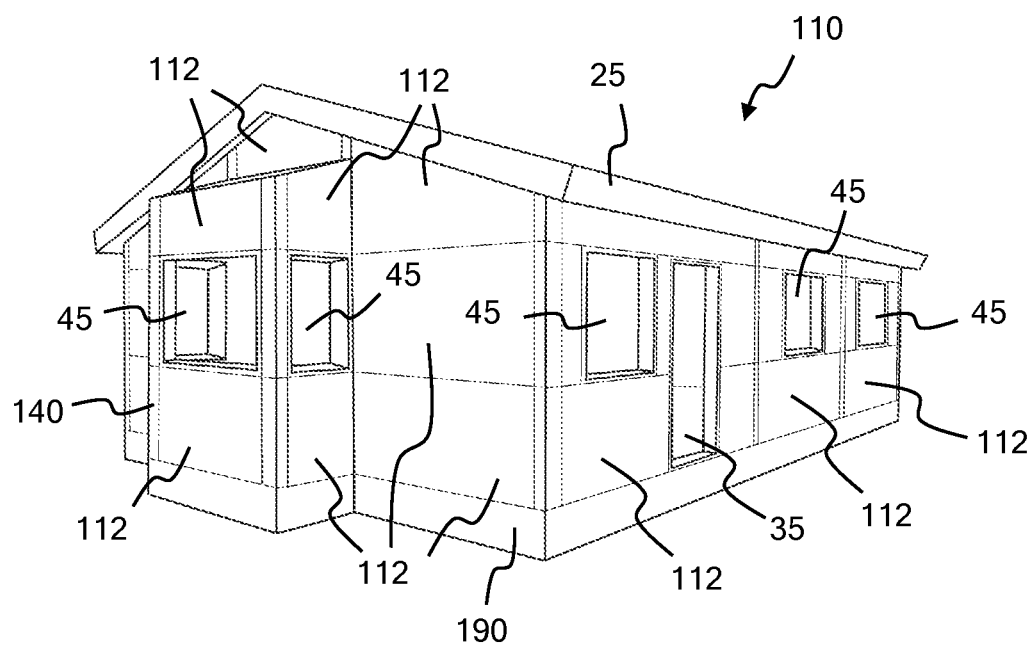
FIG. 2 shows structure 110 of FIG. 1 with the outer finish layers removed, showing that structure 110 is formed of building panels 112 according to the invention.

FIG. 1 shows a perspective view of a structure 110 according to the invention. Structure 110 in this embodiment is house 110. Structure 110 is formed of a plurality of building panels 112 (not all building panels 112 are labeled), as can be seen in FIG. 2. FIG. 2 shows structure 110 of FIG. 1, with its outer finish coatings removed so that building panels 112 can be seen. Building panels 112 form the walls of structure 110 in this embodiment. Building panels 112 have cutouts in them to form windows 45 and door 35. Roof 25 can also be formed of embodiments of building panels 112. Building panels 112 are coupled to foundation 190 to form a stable structure 110.

Figure 3:
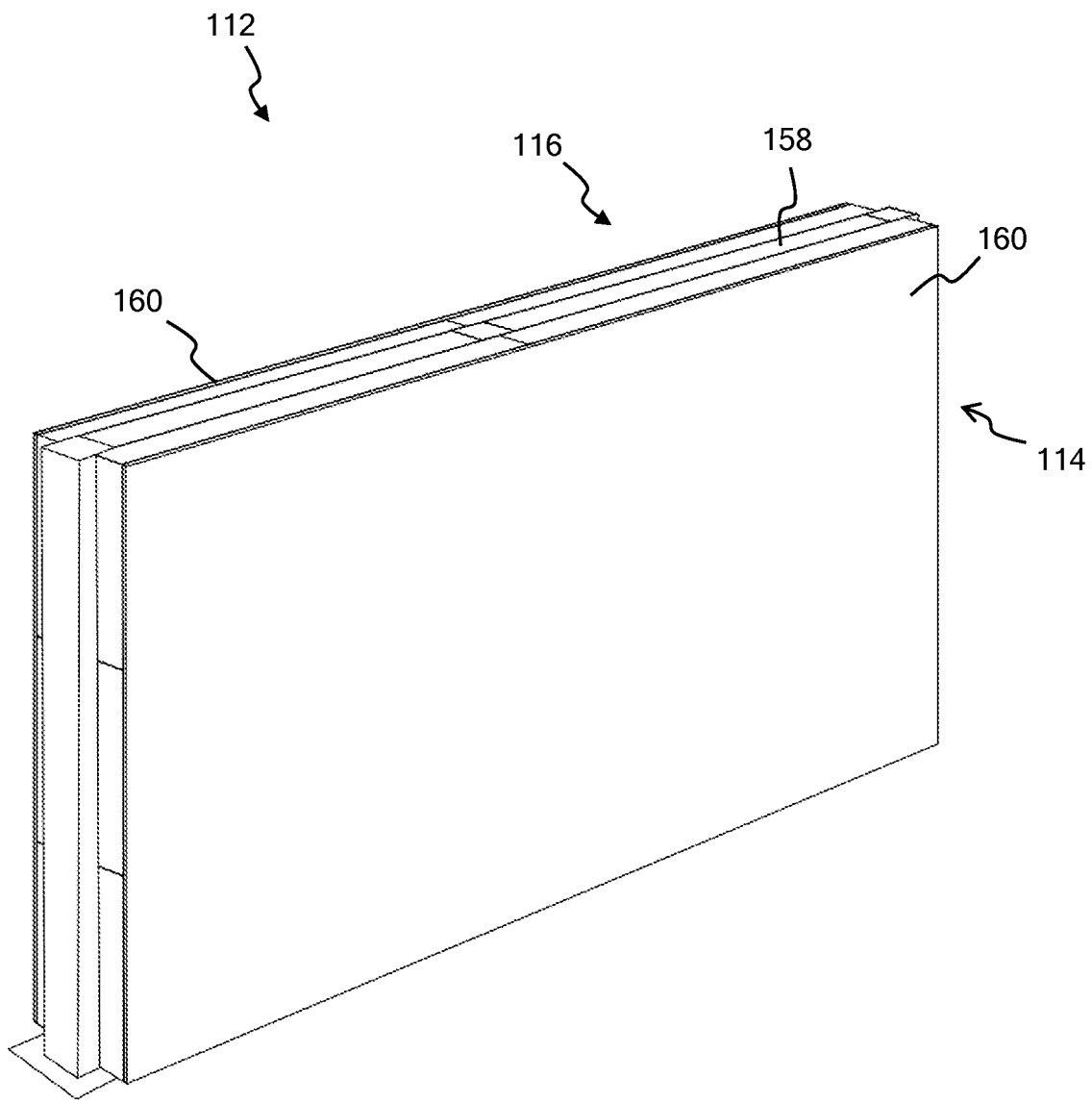
FIG. 3 is a perspective view of one embodiment of composite building panel 112 according to the invention.

FIG. 3 shows a perspective view of one embodiment of building panel 112 according to the invention. A building panel means a panel or element which is used in constructing a form, structure, building, or edifice. A building panel according to the invention can take many different forms. FIG. 3 shows one embodiment of a building panel according to the invention as building panel 112. Building panel 112 is shown including core 158 and coating 160 covering a portion of core 158. Building panel 112 is used to form walls, floors, ceilings, beams, or other elements used in creating a structure, edifice, or building.

Building panel 112 (also referred to as composite building panel 112 or just panel 112) is shown in FIG. 3 as having a rectangular shape for use as a wall of structure 110 of FIG. 1 and FIG. 2, or a block fence structure, for example. Building panel 112 can be formed in any size and shape according to the needs of the structure 110 to be built. In some embodiments building panel 112 is square, or rectangular or round, or oval, oblong or elongated. Building panel 112 can be curved, or part curved and part rectangular. Building panel 112 can take any shape. Building panel 112 takes a shape according to the shape of the structure 110 to be built. Core 158 forms the basic shape, and coating 160 covers a portion of core 158 to add strength to building panel 112, to form an impermeable layer on a portion of core 158, and/or to provide an aesthetically pleasing surface for exterior finishing. Building panel 112 has first surface 114 which includes coating 160 in this embodiment, and second surface 116 which in this embodiment also includes coating 160. Coating 160, as well as other coating embodiments that can be used as a part of building panel 112, will be discussed in detail shortly.

Figure 4:
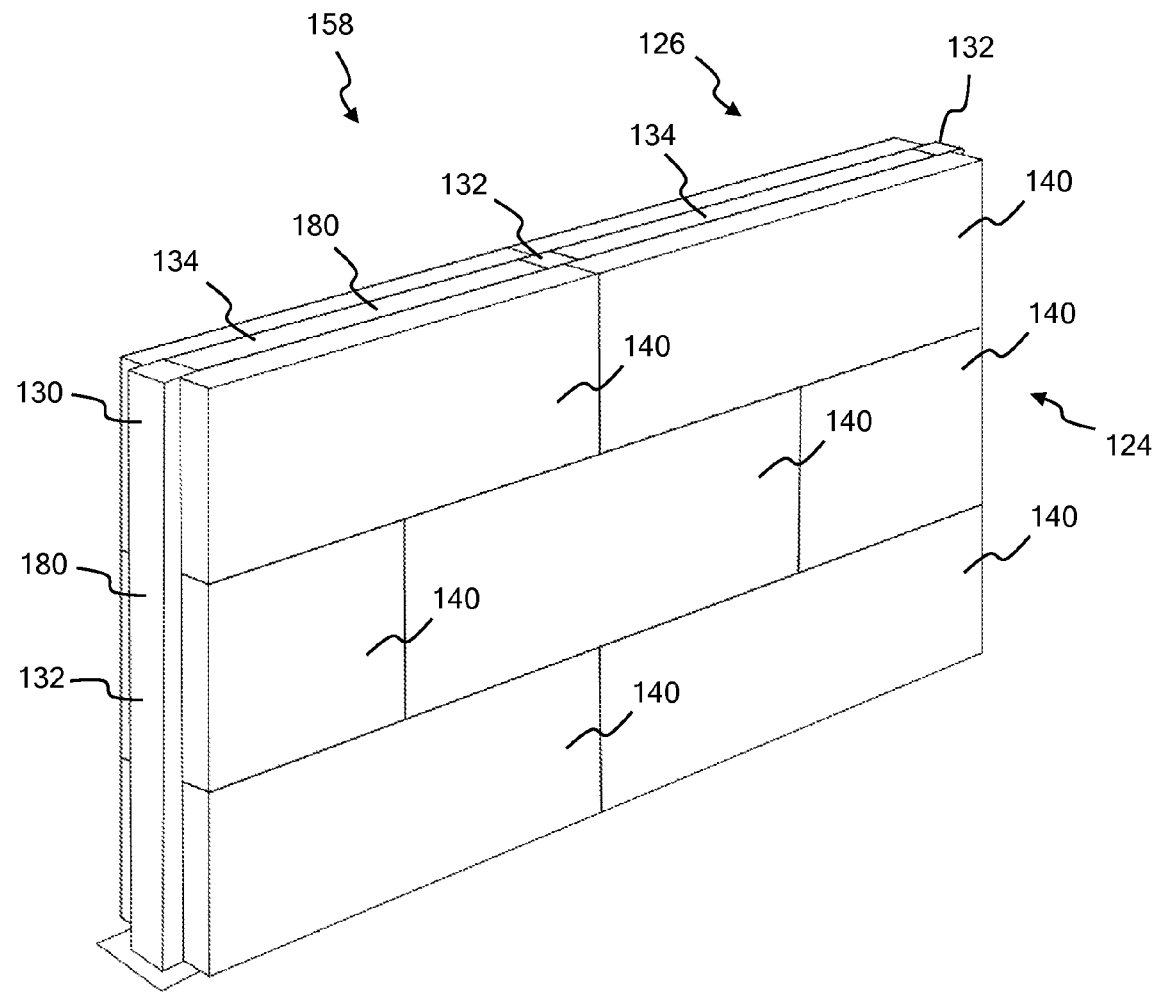
FIG. 4 is a perspective view of core 158 of building panel 112 of FIG. 3.

FIG. 4 is a perspective view of core 158 of building panel 112 of FIG. 3. Building panel 112 in this embodiment is formed of core 158 and coating 160, where coating 160 covers a portion of core 158. Core 158 and coating 160 can take many different forms. Core 158 in this embodiment has front surface 124, rear surface 126, and multiple sides 180 (two of four sides 180 shown) as shown in FIG. 4. Coating 160 according to the invention covers a portion of core 158. In this embodiment coating 160 covers both front surface 124 and rear surface 126 of core 158. Coating 160 can cover any portion of core 158. Core 158 is formed in this embodiment of frame 130 and at least one insulating structural block 140, as shown in FIG. 4 through FIG. 7. In this embodiment core 158 includes more than one insulating structural block 140. In some embodiments core 158 includes one insulating structural block 140. In some embodiments core 158 includes one or more than one insulating structural block 140. In some embodiments core 158 includes only one or more than one insulating structural block 140, with no frame 130. In some embodiments core 158 includes other elements in addition to or instead of frame 130 or insulating structural blocks 140, such as electrical wires, water pipes, other utilities or elements needing to be sent through or within structure 110.

Figure 5:
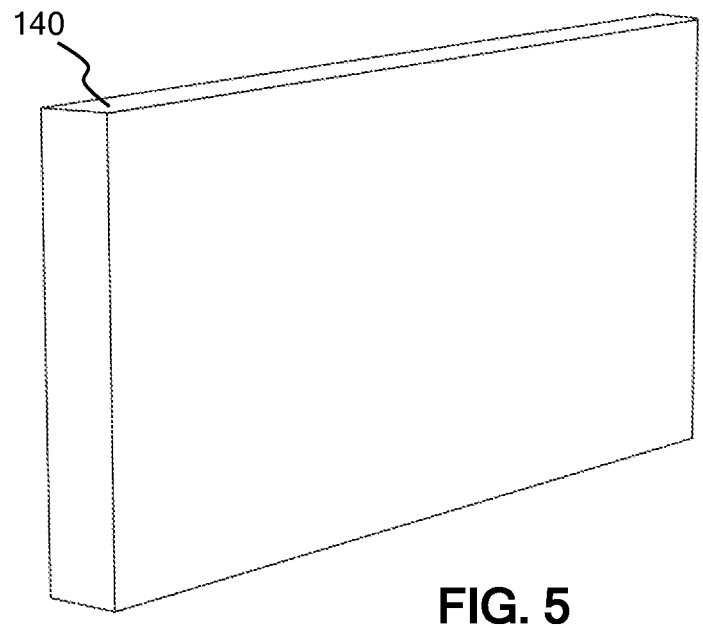
FIG. 5 is a perspective view of one embodiment of insulating structural block 140 that can be a part of core 158 according to the invention, which is part of building panel 112 according to the invention of FIG. 3.
Figure 6:
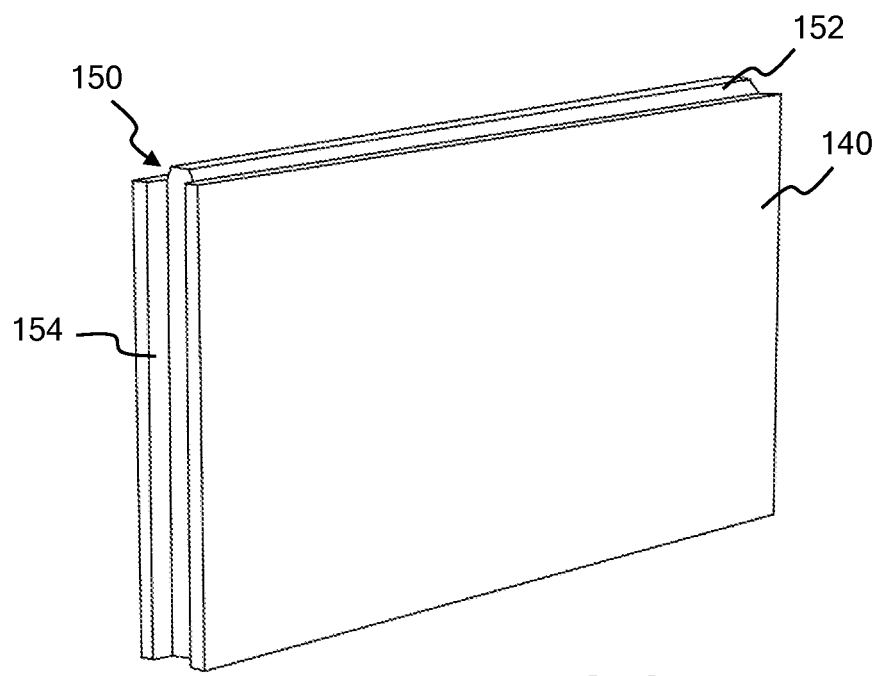
FIG. 6 is a perspective view of another embodiment of insulating structural block 140 having interlocking features 150. This embodiment of insulating structural block 140 is a part of core 158 of FIG. 4, which is part of building panel 112 according to the invention of FIG. 3.
Figure 7:
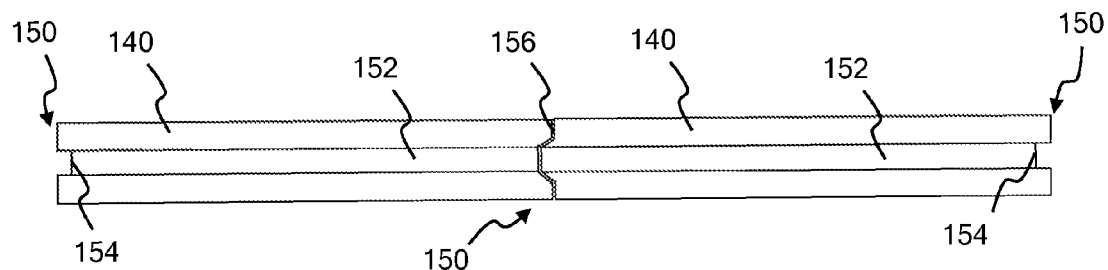
FIG. 7 is a top view of two interlocked insulating structural blocks 140 of building panel 112 of FIG. 3, with insulating structural blocks 140 having interlocking features 150.

FIG. 5 is a perspective view of an insulating structural block 140 that can be used in composite building panel 112 according to the invention. FIG. 6 is a perspective view of another insulating structural block 140 that can be used in composite building panel 112 according to the invention. In FIG. 6 insulating structural block 140 includes interlock elements 150. Interlock elements 150 are used to interlock multiple insulating structural blocks 140 to each other and to interlock insulating structural blocks 140 to frame 130. FIG. 7 is a top view of two interlocked insulating structural blocks 140 of building panel 112 of FIG. 3, with interlocking features 150 which interlock insulating structural blocks 140 and frame 130 as detailed in FIG. 8 through FIG. 10.

In some embodiments of building panel 112, core 158 is made solely of insulating structural blocks 140. In some embodiments core 158 is made of insulating structural blocks 140 and frame 130, as shown in FIG. 4 and FIG. 8 through FIG. 10. In some embodiments core 158 is made of other elements besides insulating structural blocks 140 and frame 130. Core 158 can be formed of any material or materials that provide the necessary building-shaped elements and that accepts coating 160 to create building panel 112 according to the invention. Core 158 can be formed of wood, metal, recycled materials, straw, concrete blocks, plastic, or any other material or combination of materials. Insulating structural blocks 140 are also referred to in this document as simply "blocks" 140.

Frame 130 in this embodiment creates the skeletal structure for the walls, floors, ceiling, beams, or other building elements that are needed to form a structure using building panel 112. Frame 130 in the embodiment shown in FIG. 4 includes vertical members 132 and horizontal members 134. In this embodiment frame 130 is formed of galvanized steel. Frame 130 according to the invention can be made of other structural material such as wood, aluminum, other metals, plastic, recycled material, etc. In this embodiment frame 130 is formed from 4"×4"×3/16" galvanized steel box tubing. Horizontal members 134 and vertical members 132 are coupled in a manner which holds the members together solidly. In some embodiments mechanical attachments such as bolts are used. In some embodiments the members of frame 130 are welded together. In some embodiments the individual members of frame 130 connect together at angles other than horizontal and vertical. Diagonal frame members are used in some embodiments of frame 130. In some embodiments frame 130 includes metal straps running diagonally. It is to be understood that frame 130 according to the invention can take many different shapes and sizes according to the specifics of the structure to be built. Frame 130 can be formed of many different materials according to the structural strength needed by the structure to be built.

Frame 130 in this embodiment is embedded in insulating structural blocks 140. Frame 130 being embedded in blocks 140 means that the majority of frame 130 is encased in blocks 140, with a minimum of surface area of frame 130 not covered by blocks 140. Embedded is meant to mean "encase" or "cover a majority of the surface of". Frame 130 is embedded in insulating structural blocks 140 by cutting blocks 140 into shapes that will encircle and couple to frame 130. Having frame 130 embedded in insulating structural blocks 140 provides several advantages for building panel 112. Frame 130 being embedded in blocks 140 provides structural strength to core 158 and yet leaves most of the outer surface of core 158 as a surface of blocks 140, so that the outer surface of core 158 can be easily shaped and covered with coating 160. Thus coating 160 covers surfaces of insulating structural blocks 140 instead of frame 130. This allows core 158 and building panel 112 to be shaped for aesthetically pleasing shapes, and provides the outer surface as a surface of insulating structural blocks 140, which accepts and retains coating 160 for strength and exterior finishing. In this embodiment, where frame 130 is embedded in blocks 140, there are portions of frame 130 which are not covered by block 140 so that frame 130 can be connected to other frames and structures, but the majority of frame 130 is embedded in blocks 140. In other embodiments of building panel 112 frame 130 is not embedded in blocks 140, meaning that significant portions of frame 130 are on the exterior surface of core 158.

Insulating structural blocks 140 have several purposes, including defining the shape of the building panel 112 being created, providing insulating properties, and providing a surface for applying coating 160 or other coatings or layers. Coating 160 or other coatings are applied to the outer surface of core 158. The outer surface of core 158 is formed mostly of surfaces or insulating structural blocks 140, since frame 130 is embedded in insulating structural blocks 140. Insulating structural blocks 140 in core 158 of FIG. 4 are used to enclose frame 130 elements and to form the desired shape of the structure to be built with building panel 112. Some embodiments of insulating structural blocks 140 according to the invention are shown in FIG. 5, FIG. 6 and FIG. 7. Blocks 140 are often formed to interlock with each other and with frame 130 as shown in FIG. 4, and FIG. 6 through FIG. 10. In this embodiment insulating structural blocks 140 according to the invention are made of expanded polystyrene (EPS) foam, creating an EPS foam insulating structural block 140. EPS foam blocks provide high energy efficiency and are lightweight. EPS foam can be created from recycled materials and can itself be recycled. Another desirable feature of EPS foam block 140 is that it can be easily molded or cut into any desired shape. FIG. 6 and FIG. 7 shows EPS foam insulating structural blocks 140 that have been cut to include interlock elements 150, where interlock elements 150 in this embodiment include tongue 152 and groove 154. Blocks 140 can be made into any shape, size, and structure according to the structure being built using building panel 112. In this embodiment insulating structural blocks 140 are 4'×8'×6" EPS foam insulating structural blocks, which have interlocking elements 150 cut into them so that they interlock with themselves and with frame 130 to create core 158 as shown in FIG. 4. In this embodiment one pound density EPS foam is used for blocks 140 but any suitable material and density can be used which provides suitable structural characteristics. Blocks 140 are connected to each other and to concrete in this embodiment using a polymer-based acrylic adhesive 156 such as Primus® sold by Dryvit Systems Inc. (Dryvit). Blocks 140 are coupled to metal or wood in this embodiment using a water-based acrylic copolymer adhesive such as Adhesive for EPS (ADEPS) from Dryvit. In some embodiments insulating structural blocks 140 and frame 130 are coupled to other members and to each other using different adhesives, glues, mechanical attachments, or other suitable coupling means.

In this embodiment insulating structural block 140 is made of EPS foam. Insulating structural block 140 according to the invention can be made of other materials, including but not limited to straw, wood, plastic, paper, concrete, or recycled materials.

In the embodiment of core 158 of FIG. 4, insulating structural block 140 is cut to shape from the rectangular EPS foam blocks 140 as shown in FIG. 5 to create the shaped insulating structural blocks 140 as shown in FIG. 6. Cutouts and interlocking elements are cut from blocks 140 to create a block 140 shape that will enclose frame 130, interlock with other blocks 140 and frame 130, receive coating 160, and provide a surface of the desired shape for the structure to be built. Blocks 140 according to the invention can be molded to shape or formed to the correct size and shape using methods such as slicing, melting, or other block-shaping methods. Block 140 can be formed to any size and shape needed to create the structure being formed, such as walls, floors, roofs, ceilings, beams, fences, bridges, edifices, offices, etc. Blocks 140 and frame 130 can be formed into any size and shape to create core 158 and building panel 112 in any size and shape to form the desired structure.

Openings and passageways for utilities, air flow, or other types of access openings through building panel 112 can be easily cut into core 158 as desired. Openings for windows 45 and doors 35 are also formed in core 158.

In some embodiments core 158 includes structures, elements, layers, or materials that create a building panel 112 according to the invention with the ability to provide specific types of protection. In some embodiments core 158 includes structures, elements, layers or material that provide protection from penetration such as from flying objects, projectiles, or other items that could cause harm. In some embodiments core 158 encapsulates structures, layers, materials, or elements that block or slow down projectiles, flying objects, or projectiles. For example, core 158 according to the invention can include layers or materials embedded in core 158, embedded in blocks 140, or sandwiched between blocks 140 that block or slow down projectiles such as bullets. These projectile-resistant elements can provide protection to inhabitants in dangerous areas, from projectiles, or from flying objects caused by extreme weather or accidents, for example. The protective layers or materials can be man-made or natural, and can take the form of layers of mesh, layers of metal, polymer, plastic, acrylic, carbon fibers, carbon nanotubes, or other materials, or other forms.

In some embodiments core 158 includes structures, elements, layers or materials that provide sound attenuation or blockage. For example, core 158 according to the invention can include layers or materials embedded in or encapsulated by core 158, embedded in blocks 140, or sandwiched between blocks 140, that block or attenuate sound. These sound-deadening elements can provide protection to inhabitants from explosions, machinery, vehicles, or other loud noise-generators. These sound-deadening layers or materials can be man-made or natural, and can take the form of layers of mesh, layers of metal, carbon fibers, carbon nanotubes, polymer, plastic, acrylic, or other materials, or other forms. In some embodiments the sound-deadening materials form anechoic devices or layers.

In some embodiments core 158 includes structures, elements, layers or material that provide radiation attenuation or blockage. For example, core 158 according to the invention can include layers or materials embedded in or encapsulated by core 158, embedded in blocks 140, or sandwiched between blocks 140 that block or attenuate radiation. The radiation blocked or attenuated can take many forms, including electromagnetic radiation, electromagnetic pulses, radio frequency radiation, optical radiation, x-rays, nuclear radiation, radioactive radiation, or other types of radiation. These radiation-deadening elements can provide protection to inhabitants from explosions, accidents at power generating stations, acts of war, electromagnetic pulses, or acts of God. These radiation-shielding layers or materials can be man-made or natural, and can take the form of layers of mesh, layers of metal, carbon fibers, carbon nanotubes, carbon nanostructures, one or more layers of lead, polymer, plastic, acrylic, gel, or other materials, or other forms. In some embodiments the radiation-deadening materials form an element that reflects certain types of radiation. In some embodiments the radiation-deadening materials form an element that absorbs certain types of radiation. In some embodiments the radiation-deadening materials form an element that provides electromagnetic shielding. In some embodiments core 158 includes elements, structures, or materials that provide radio frequency shielding. In some embodiments core 158 includes elements, structures, or materials that provide electromagnetic interference shielding.

In some embodiments core 158 includes structures, elements, layers or material that provide chemical attenuation or blockage. For example, core 158 according to the invention can include layers or materials embedded in or encapsulated by core 158, embedded in blocks 140, or sandwiched between blocks 140 that block or attenuate one or more specific chemicals. The chemicals blocked or attenuated can take many forms, natural or man-made. The chemical attenuating or blocking elements can provide protection to inhabitants from explosions, accidents at power generating stations, acts of war, or acts of God. These layers can be man-made or natural, and can take the form of layers of mesh, layers of metal, carbon fibers, polymer, plastic, acrylic, gel, or other materials, or other forms. In some embodiments the chemical-blocking materials form an element that absorbs certain types of chemicals.

Figure 9:
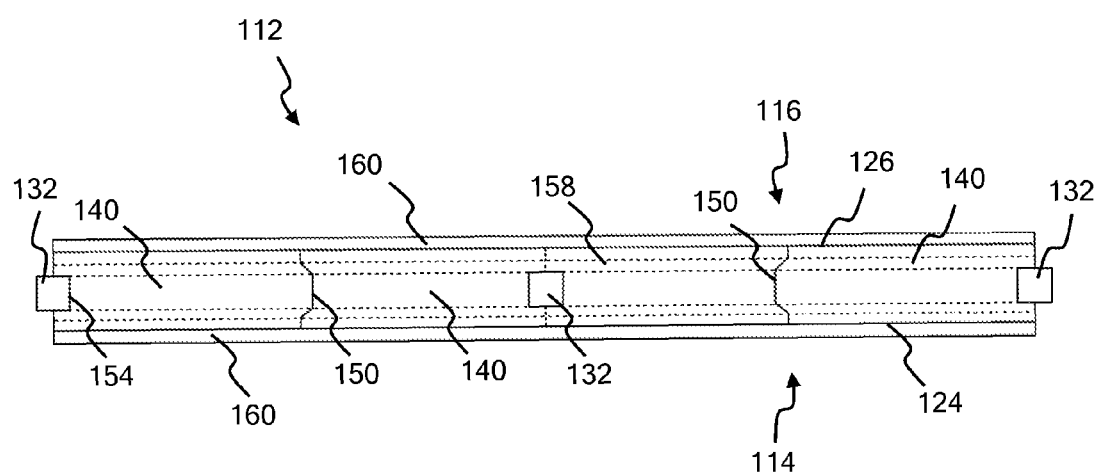
FIG. 9 shows horizontal cross-section 7-7 of building panel 112 of FIG. 8.
Figure 8:
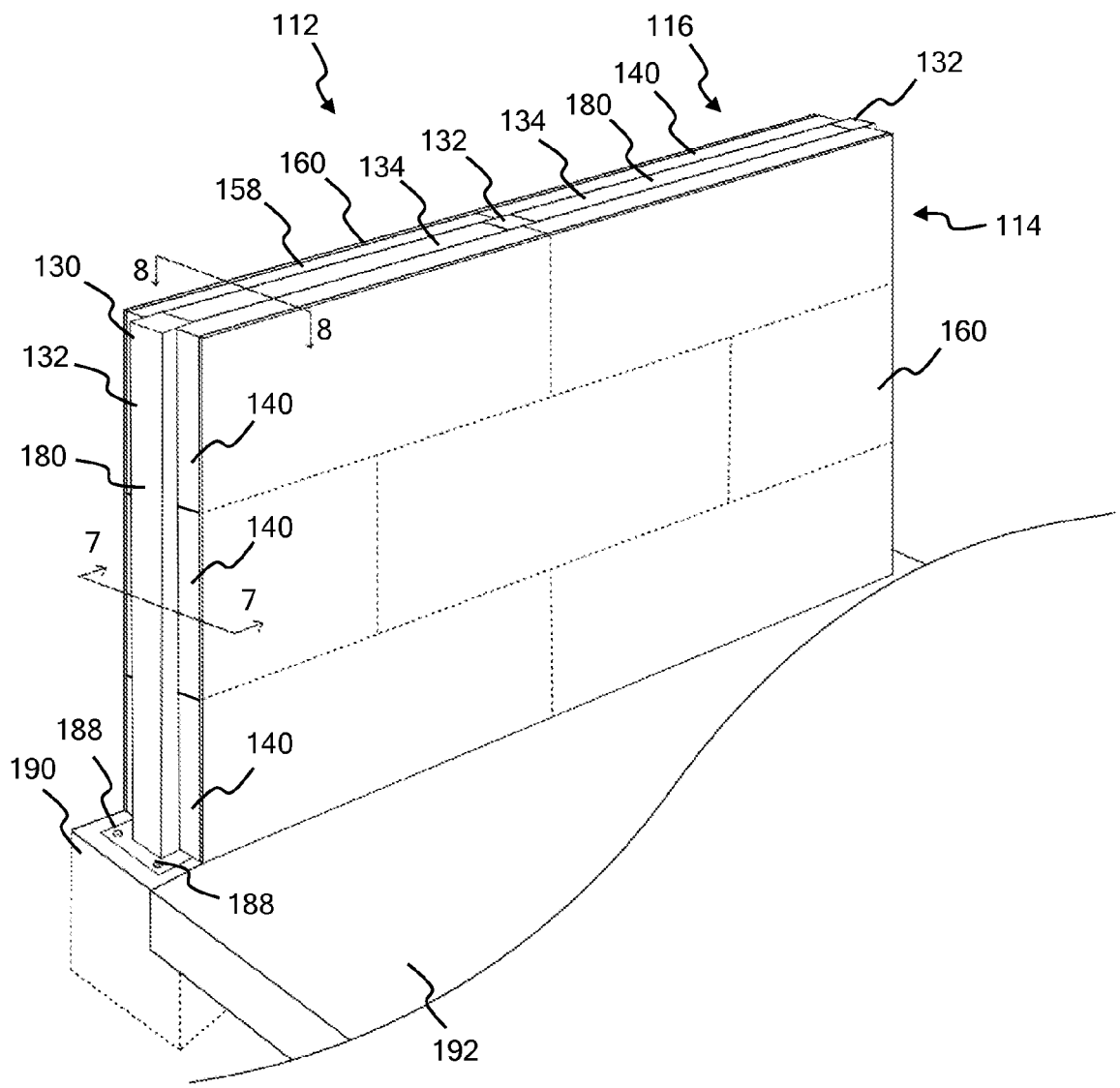
FIG. 8 shows a perspective view of core 158 with coating 160 according to the invention applied, creating building panel 112 of building panel structure 110 according to the invention.
Figure 10:
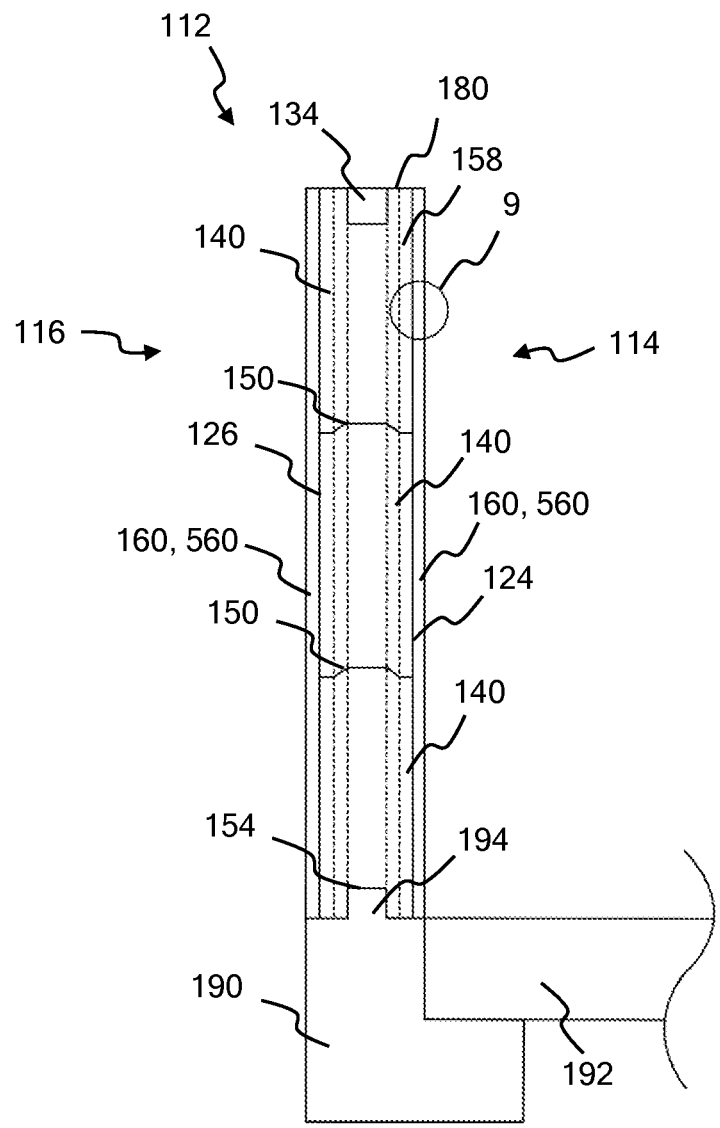
FIG. 10 shows vertical cross-section 8-8 of building panel 112 of FIG. 8.

Coating 160 covers a portion of core 158 to create building panel 112 of composite building panel structure 110 according to the invention as shown in FIG. 1 through FIG. 3 and FIG. 8 through FIG. 10. Coating 160 creates an outer surface on building panel 112 that is ready to accept exterior or interior finishing as desired and also contributes to the strength of building panel 112. FIG. 8 shows a perspective view of core 158 with coating 160 applied, creating a portion of building panel structure 110 of FIG. 1 that includes building panel 112 according to the invention. FIG. 9 shows horizontal cross section 7-7 of building panel 112 of FIG. 8. FIG. 10 shows vertical cross section 8-8 of building panel 112 of FIG. 8. Coating 16 can take many different forms. In some embodiments other coatings according to the invention are used instead of coating 160. FIG. 11 through FIG. 16 show close-up cross-sections of embodiments of coating 160 according to the invention, taken at section 9 of FIG. 10. FIG. 17 through FIG. 21 show a cross-sections of coating 560 according to the invention that can be used on building panel 112 according to the invention in place of coating 160, or in addition to coating 160.

Core 158 according to the invention has a portion covered by a coating. This document provides examples of the different coatings according to the invention that can be used to coat core 158. Embodiments of coating 160 and coating 560 according to the invention are described in this document. It is to be understood that these coatings may be used interchangeably. It is to be understood that these coatings as described are examples only and many other embodiments of coating 160 and coating 560 can be formed according to the invention.

Coating 160 of FIG. 3 and FIG. 8 through FIG. 16 covers a portion of core 158. Coating 160 in the embodiments shown covers a portion of insulating structural blocks 140 of core 158. Coating 160 can cover a portion of insulating structural blocks 140 of core 158 for many different reasons. Coating 160 can cover a portion of core 158 to add strength to core 158. Coating 160 can cover a portion of core 158 to provide an aesthetically pleasing surface finish. Coating 160 can cover a portion of core 158 to provide a surface for accepting finish treatments such as paint, stucco, or other exterior finish treatments. Coating 160 can cover a portion of core 158 to create a layer of material which protects core 158 from weather, moisture, and other deteriorating elements. Coating 160 can cover a portion of core 158 to provide projectile protection to building panel 112. Coating 160 can cover a portion of core 158 to provide protection from penetration of building panel 112. Penetration protection can include resistance to penetration by flying or moving objects created by wind, weather, war, natural, or man-caused events. For example, strong winds can cause items as simple as straw or wood pieces to penetrate building walls. Coating 160 can provide protection from this type of penetration. In addition, it is often desirable to protect a building from penetration by bullets or other projectiles. Coating 160 can include projectile protection layers that resist penetration by ammunition and other projectiles.

Coating 160 can cover a portion of core 160 to provide protection and/or shielding from various forms of radiation, including electromagnetic radiation, radioactive radiation, or other types of signals or radiation that travel through the atmosphere and that can be damaging to inhabitants of a building or structure. Coating 160 can include radiation blocking layers that minimize or eliminate the transfer of radiation through building panel 112. Coating 160 can also provide sound attenuating characteristics to building panel 112. In some embodiments coating 160 includes elements, structures, or materials that provide radio frequency shielding. In some embodiments coating 160 includes carbon fibers, carbon nanotubes, or carbon nanostructures. In some embodiments coating 160 includes elements, structures, or materials that provide electromagnetic interference shielding. In some embodiments coating 160 includes elements, structures, or materials that provide electromagnetic radiation shielding or attenuation. In some embodiments coating 160 includes elements, structures, or materials that provide electromagnetic pulse shielding.

In some embodiments coating 160 covers exterior surfaces of structure 110. In some embodiments coating 160 covers interior surfaces of structure 110. In some embodiments coating 160 covers front or back surfaces of core 158. In some embodiments coating 160 covers edge surfaces of core 158. Coating 160 can cover any surface of core 158 or a portion of any surface of core 158. In the embodiment shown in FIG. 1 through FIG. 16, coating 160 covers front surface 124 of core 158 to create first surface 114 of building panel 112. In the embodiment shown in FIG. 1 through FIG. 16, coating 160 covers rear surface 126 of core 158 to create second surface 116 of building panel 112. In this way building panel 112 includes core 158 and coating 160 covering at least a portion of core 158. In this way building panel 112 includes core 158 and coating 160 covering at least a portion of front surface 124 or rear surface 126 of core 158.

FIG. 11 through FIG. 16 show cross-sections of embodiments of coating 160 according to the invention. In these embodiments coating 160 forms a cementitious membrane which provides structural strength to building panel 112 as well as providing a layer impervious to water and weather, and a layer that is ready to accept final exterior or interior finishes such as paint, stucco, or other finishes.

Figure 11:
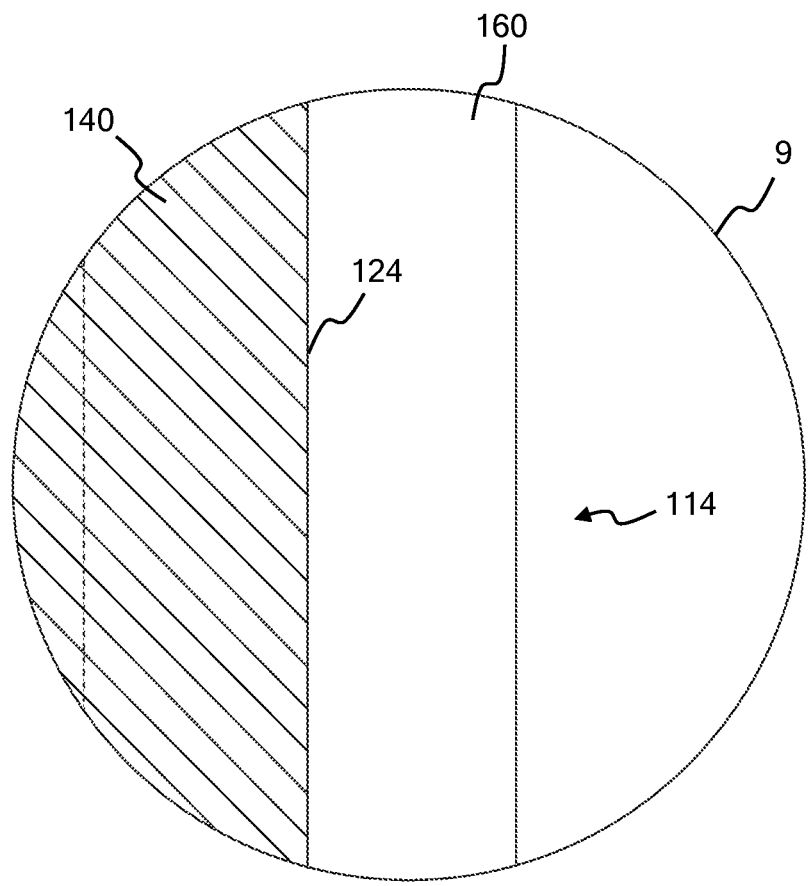
FIG. 11 shows a close-up cross-section of one embodiment of coating 160 according to the invention taken at section 9 of FIG. 10.

In the embodiment of coating 160 shown in FIG. 11, coating 160 is a single layer of a cementitious mixture. Cement as is used in this document typically refers to Portland cement or other cementitious binder material such as what is used to form concrete. In some embodiments coating 160 includes cement and acrylic bonder. Acrylic bonder as used in this document refers to a synthetic thermoplastic resin, binder, or bonder that is often formed of an acrylic polymer. Acrylic bonder helps the cementitious mixture adhere well to the EPS foam insulating structural block, as well as binding together the materials in coating 160.

In some embodiments coating 160 includes aggregate. Aggregate adds strength to coating 160 and helps coating 160 provide concrete-type characteristics including strength and resistance to penetration. The aggregate can be many different materials. Varying the aggregate material allows the tuning of the characteristics of coating 160. An aggregate of vermiculite, perlite, or other thermal filter material allows coating 160 to have high thermal resistance. In some embodiments other materials which give coating 160 high thermal resistance are used in coating 160. An aggregate of ceramic makes coating 160 reflect heat and sunlight, helping building panel 112 to resist heat absorption. In some embodiments other materials which give coating 160 high thermal reflectance are used in coating 160. Other types of aggregate can be used to add strength and other characteristics to coating 160. In some embodiments other materials which give coating 160 high thermal emittance are used in coating 160. High thermal emittance means coating 160 will tend to emit any heat that it absorbs, which contributes to keeping coating 160 and building panel 112 cool. In some embodiments coating 160 is formed of a plaster mixture. In some embodiments coating 160 is formed of a gypsum plaster mixture.

In some embodiments coating 160 includes cement and ceramic. In some embodiments coating 160 includes cement and aggregate. In some embodiments the aggregate is or includes the ceramic material. In some embodiments coating 160 includes Portland cement and ceramic. In some embodiments coating 160 is a non-cementitious mixture that includes ceramic. In some embodiments coating 160 includes Portland cement, acrylic bonder, and a ceramic aggregate. In some embodiments coating 160 includes cement, acrylic bonder, fiberglass strands, and a ceramic aggregate. In some embodiments coating 160 includes cement, acrylic bonder, fiberglass strands, a fiberglass mesh, and a ceramic aggregate. Ceramic included in coating 160 provides a layer that reflects heat and sunlight from coating 160, which allows coating 160 and building panel 112 to remain cool.

In some embodiments coating 160 includes strands of reinforcing material. Strands of reinforcing material increase the strength and resistance to breaking and cracking of coating 160. In some embodiments the strands of reinforcing material are fiberglass strands. In some embodiments the strands of reinforcing material are cotton strands. In some embodiments the strands of reinforcing material are metal or plastic strands. In some embodiments the strands of reinforcing material are wood or other fibrous material strands. The strands of reinforcing material can be any material that either makes coating 160 have a stronger flex or shear strength, and/or keep coating 160 from cracking.

In some embodiments coating 160 includes a mesh of a material. The mesh can be for many different purposes. In some embodiments coating 160 includes a reinforcing mesh structure. The reinforcing mesh structure adds strength and resistance to cracking to coating 160. In some embodiments coating 160 includes a fiberglass mesh. In some embodiments coating 160 includes a cotton mesh. Fiberglass and cotton, as well as other plastic or Kevlar meshes, for example, provide structural reinforcement to coating 160. In some embodiments coating 160 includes a metal mesh. A metal mesh can provide radiation shielding characteristics to coating 160. A metal mesh can provide electromagnetic attenuation properties to coating 160. A metal mesh can also be connected to electronic processors, electrical conductors, and powered electronics to provide active electronic processing properties to coating 160. In other words, coating 160 can be made to carry electricity and be a part of an electronic processing structure. This can be useful for many different reasons, such as electronically sensing the characteristics of a building panel 112, for heating or cooling building panel 112, for improving the electrical attenuation or amplification properties of building panel 112, for distribution of energy throughout building panel 112, or any other electronic processing capabilities. Coating 160 can include many types of mesh materials for different purposes.

In some embodiments coating 160 includes thermal filters for increasing the thermal efficiency of coating 160, which helps building panel 112 to resist heat transfer. In some embodiments coating 160 includes penetration-resistant materials, layers, or structures such as one or more than one projectile or ammunition-resistant material or structure. In some embodiments coating 160 includes radiation blocking or inhibiting layers, materials, components, or structures. In some embodiments coating 160 includes a layer, component or structure formed of lead. In some embodiments coating 160 includes sound attenuating or inhibiting layers, materials, components, or structures. In some embodiments coating 160 includes carbon fibers, carbon nanotubes, or carbon nanostructures. In some embodiments coating 160 includes elements, structures, or materials that provide radio frequency shielding. In some embodiments coating 160 includes elements, structures, or materials that provide electromagnetic interference shielding. In some embodiments coating 160 includes an electromagnetic shield material.

In some embodiments coating 160 includes structures, elements, layers or material that provide protection from penetration such as from flying objects, or projectiles. In some embodiments coating 160 includes elements, structures, or materials that prevent projectiles from piercing coating 160. These elements, structures, or materials are called projectile-resistant materials and they prevent projectiles from penetrating coating 160. In some embodiments projectile-resistant materials are a mesh such as a fiberglass or Kevlar mesh. In some embodiments projectile-resistant materials are carbon nanostructures. In some embodiments projectile-resistant materials are a lead or steel or other metal material. In some embodiments projectile-resistant materials are the aggregate, such as when lead or steel nodules are used as the aggregate in the mixture, for example but not by way of limitation. In some embodiments projectile-resistant materials are other structures or materials that prevent penetration from a projectile. These elements can provide protection to inhabitants in dangerous areas from projectiles such as bullets, or from flying objects caused by extreme weather or accidents, for example. The protective projectile-resistant materials can be man-made or natural, and can take the form of layers of mesh, layers of metal, polymer, plastic, acrylic, carbon fibers, carbon nanotubes, or other materials, or other forms.

In some embodiments coating 160 includes structures, elements, layers or materials that provide sound attenuation or blockage. Sound attenuation materials work as sound-deadening elements that can provide protection to inhabitants from explosions, machinery, vehicles, or other loud noise-generators. These sound-deadening or sound attenuation materials can be man-made or natural, and can take the form of layers of mesh, layers of metal, carbon fibers, carbon nanotubes, polymer, plastic, acrylic, or other materials, or other forms. In some embodiments the sound-deadening materials form anechoic devices or layers.

In some embodiments coating 160 includes structures, elements, layers or materials that provide radiation attenuation or blockage. The radiation blocked or attenuated can take many forms, including electromagnetic radiation, electromagnetic pulses, radio frequency radiation, optical radiation, x-rays, nuclear radiation, radioactive radiation, or other types of radiation. These radiation attenuation materials can provide protection to inhabitants from explosions, accidents at power generating stations, acts of war, electromagnetic pulses, or acts of God. These radiation-shielding layers or materials can be man-made or natural, and can take the form of layers of mesh, layers of metal, carbon fibers, carbon nanotubes, carbon nanostructures, one or more layers of lead, polymer, plastic, acrylic, gel, or other materials, or other forms. In some embodiments the radiation attenuation materials form an element that reflects certain types of radiation. In some embodiments the radiation attenuation materials form an element that absorbs certain types of radiation. In some embodiments the radiation attenuation materials form an element that provides electromagnetic shielding. In some embodiments coating 160 includes elements, structures, or materials that provide radio frequency shielding. In some embodiments coating 160 includes elements, structures, or materials that provide electromagnetic interference shielding.

In some embodiments coating 160 includes structures, elements, layers or materials that provide chemical attenuation or blockage. The chemicals blocked or attenuated can take many forms, natural or man-made. These chemical attenuating or blocking materials can provide protection to inhabitants from explosions, accidents at power generating stations, acts of war, or acts of God. These layers can be man-made or natural, and can take the form of layers of mesh, layers of metal, carbon fibers, polymer, plastic, acrylic, gel, or other materials, or other forms. In some embodiments the chemical-blocking materials form an element that absorbs certain types of chemicals.

Figure 12:
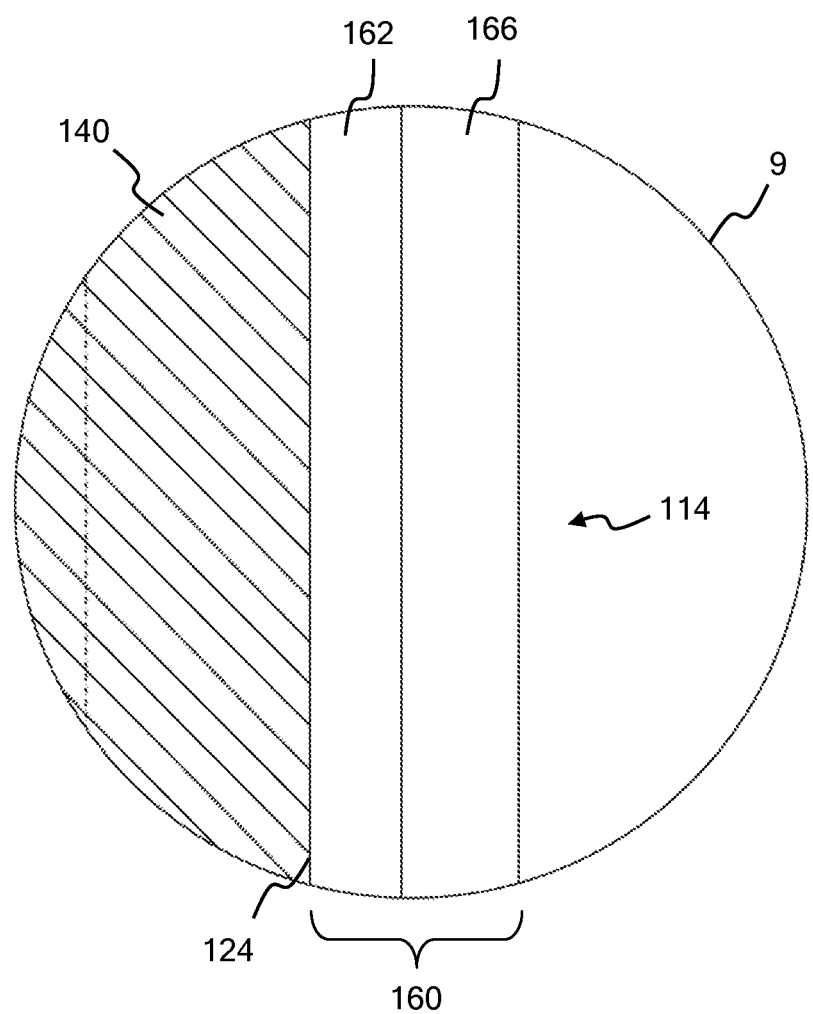
FIG. 12 shows a close-up cross-section of another embodiment of coating 160 according to the invention taken at section 9 of FIG. 10.

In the embodiment shown in FIG. 12, coating 160 is formed of inner scratch layer 162 (also called scratch layer 162) and outer main brown layer 166 (also called main brown layer 166). Dividing coating 160 into two or more layers allows different layers to be optimized for different purposes. One layer can reflect heat, for instance, while another slows down heat transfer, or blocks radiation, for example but not by way of limitation Inner scratch layer 162 contributes to the structural strength of coating 160, forming an interface between building panel core 158 and outer main brown layer 166. A scratch layer is also a layer that adheres well to core 158 and provides a base for further layers, such as outer main brown layer 166, to adhere to. Scratch layer 162 can be formed of many different components or mixtures or layers. In some embodiments scratch layer 162 is formed of a plaster mixture. In some embodiments scratch layer 162 is formed of a gypsum plaster mixture. In some embodiments scratch layer 162 is formed of a non-cementitious mixture. In some embodiments scratch layer 162 is formed of a cementitious mixture. In some embodiments scratch layer 162 includes Portland cement and ceramic. In some embodiments scratch layer 162 includes Portland cement, acrylic bonder, and a ceramic aggregate. In some embodiments scratch layer 162 includes Portland cement, acrylic bonder, fiberglass strands, and a ceramic aggregate. In some embodiments scratch layer 162 includes Portland cement, acrylic bonder, fiberglass strands, a fiberglass mesh, and a ceramic aggregate. Ceramic included in inner scratch layer 162 provides a thermal barrier, preventing heat transfer into and out of building panel core 158.

Scratch layer 162 can include any of the elements structures, or materials discussed earlier with respect to the elements and materials that can be included in coating 160. In some embodiments scratch layer 162 includes a fiberglass mesh. In some embodiments scratch layer 162 includes thermal filters for fire resistance. In some embodiments scratch layer 162 includes penetration-resistant materials, layers, or structures such as one or more than one projectile or ammunition-resistant material or structure. In some embodiments scratch layer 162 includes radiation blocking or inhibiting layers, materials, components, or structures. In some embodiments inner scratch layer 162 includes a layer, component or structure formed of lead. In some embodiments scratch layer 162 includes sound attenuating or inhibiting layers, materials, components, or structures. In some embodiments scratch layer 162 includes carbon fibers, carbon nanotubes, or carbon nanostructures. In some embodiments scratch layer 162 includes elements, structures, or materials that provide radio frequency shielding. In some embodiments scratch layer 162 includes elements, structures, or materials that provide electromagnetic interference shielding. In the embodiment of coating 160 shown in FIG. 12 through FIG. 16, scratch layer 162 is a cementitious mixture. Scratch layer 162 can be any type or form of cementitious mixture. In some embodiments scratch layer 162 includes one or more than one piece of fiberglass mesh. In some embodiments scratch layer 162 is formed of multiple layers (see FIG. 16 for an example of a multiple-layer scratch layer 162).

Main brown layer 166 can include any of the elements structures, or materials discussed earlier with respect to the elements and materials that can be included in coating 160. Outer main brown layer 166 is a cementitious mixture in this embodiment. Outer main brown layer 166 can be any type of form of cementitious mixture. In some embodiments main brown layer 166 includes one or more than one piece of fiberglass mesh. In some embodiments main brown layer 166 includes cement and ceramic. In some embodiments main brown layer 166 includes a cementitious mixture and ceramic. In some embodiments main brown layer 166 includes cement, acrylic bonder, and ceramic. In some embodiments main brown layer 166 includes cement, acrylic bonder, aggregate, and ceramic. In some embodiments main brown layer 166 includes cement, acrylic bonder, and a ceramic aggregate. In some embodiments main brown layer 166 includes cement, acrylic bonder, fiberglass strands, and ceramic. In some embodiments main brown layer 166 includes cement, acrylic bonder, fiberglass strands, ceramic, and aggregate. In some embodiments main brown layer 166 includes cement, acrylic bonder, fiberglass strands, and a ceramic aggregate. In some embodiments main brown layer 166 includes Portland cement, acrylic bonder, fiberglass strands, a fiberglass mesh, and a ceramic aggregate. A ceramic material included in main brown layer 166 provides a thermal barrier, preventing heat from being absorbed or transferred into building panel core 158.

In some embodiments main brown layer 166 is formed of multiple layers. In some embodiments main brown layer 166 includes cement, aggregate, and fiberglass mesh. In some embodiments main brown layer 166 includes cement, aggregate, and acrylic bonder. In some embodiments main brown layer 166 includes thermal filters for fire resistance. In some embodiments main brown layer 166 includes cement, aggregate, and fiberglass strands. In some embodiments main brown layer 166 includes cement, aggregate, acrylic bonder, and a fiberglass mesh. In some embodiments main brown layer 166 includes penetration-resistant materials, layers, or structures such as one or more than one projectile or ammunition-resistant material or structure. In some embodiments main brown layer 166 includes radiation blocking or inhibiting layers, materials, components, or structures. In some embodiments main brown layer 166 includes a layer, component or structure formed of lead. In some embodiments main brown layer 166 includes carbon fibers, carbon nanotubes, or carbon nanostructures. In some embodiments main brown layer 166 includes sound attenuating or inhibiting layers, materials, components, or structures.

Figure 13:
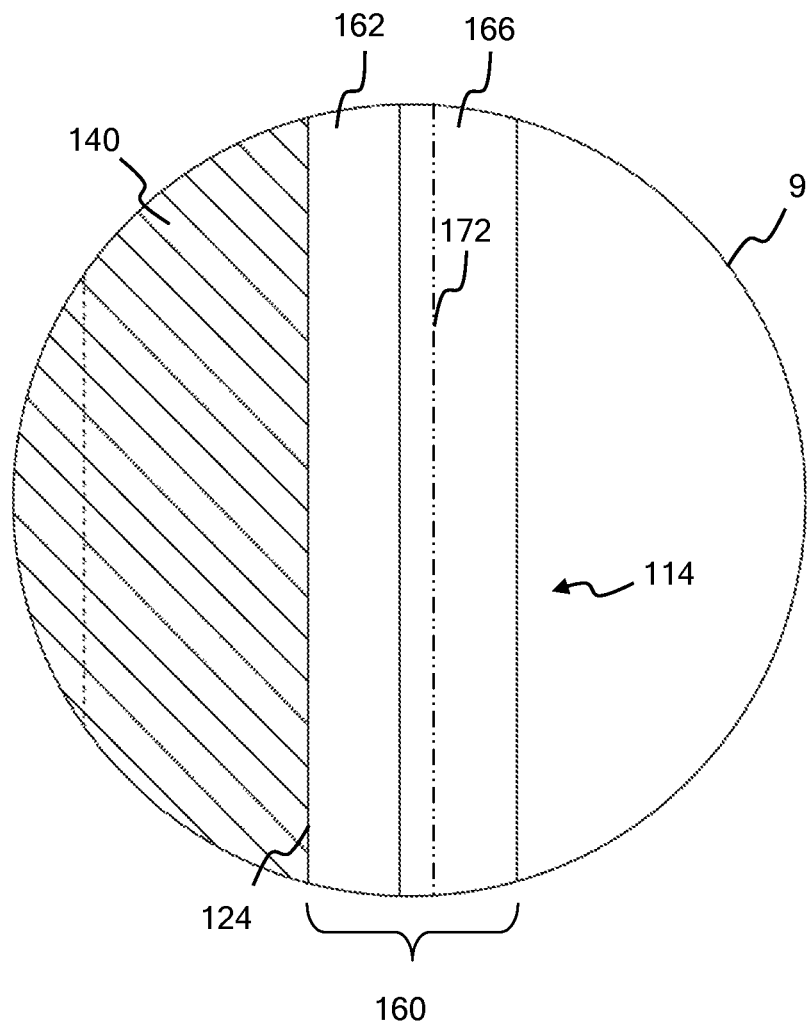
FIG. 13 shows a close-up cross-section of another embodiment of coating 160 according to the invention taken at section 9 of FIG. 10.

In some embodiments main brown layer 166 includes elements, structures, or materials that provide radio frequency shielding, coupling, or amplifying. In some embodiments main brown layer 166 includes elements, structures, or materials that provide electromagnetic interference shielding. For example, coating 160 as shown in FIG. 13 shows main brown layer 166 that includes electronic mesh structure 172. In some embodiments electronic mesh structure 172 is designed to protect from electromagnetic pulses, for example, or certain electromagnetic frequencies. Electronic mesh structure 172 can be used to prevent electromagnetic radiation from passing through coating 160. In some embodiments electronic mesh structure 172 in adjacent building panels 112 are electronically coupled to form a Faraday cage around the interior of structure 110, protecting the contents of structure 110 from electromagnetic radiation pulses or electromagnetic static. In some embodiments electronic mesh structure 172 is designed to act as an antenna or amplifier for certain electromagnetic frequencies. Electronic mesh structure 172 can be designed to block certain electromagnetic frequencies, attenuate certain electromagnetic frequencies, amplify certain electronic frequencies, or perform modification or conditioning of electromagnetic energy that is incident on building panel 112. In some embodiments electronic mesh structure 172 conducts electricity throughout building panel 112 or from one building panel 112 to another. In some embodiments electronic mesh structure 172 is electrically coupled to electronic processors or semiconductor chips. Electronic mesh structure 172 is shown in main brown layer 166, but electronic mesh structure 172 can be included in any coating layer, such as single-layer coating 160 as shown in FIG. 11, or in scratch layer 162, or any of the other coatings or layers used to cover a portion of core 158.

Figure 14:
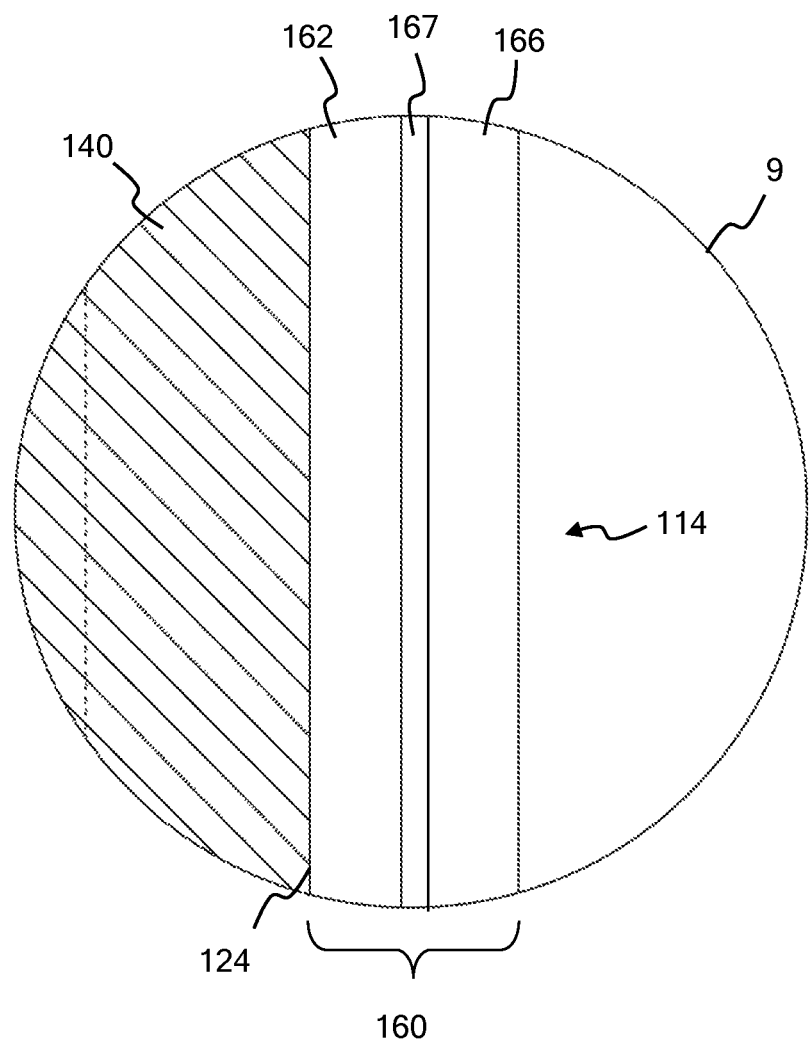
FIG. 14 shows a close-up cross-section of another embodiment of coating 160 according to the invention taken at section 9 of FIG. 10.
Figure 15:
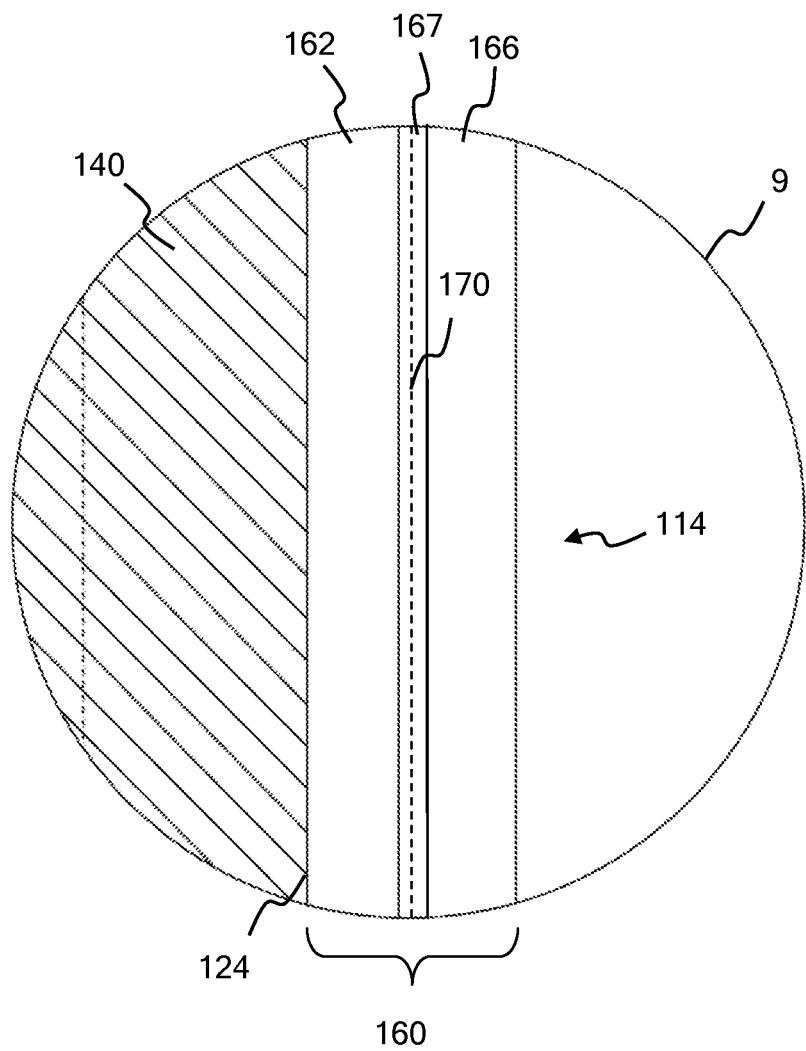
FIG. 15 shows a close-up cross-section of another embodiment of coating 160 according to the invention taken at section 9 of FIG. 10.

FIG. 14 and FIG. 15 show additional embodiments of coating 160 according to the invention. Coating 160 as shown in FIG. 14 and FIG. 15 are the same or similar to coating 160 shown in FIG. 12, except that coating 160 as shown in FIG. 14 and FIG. 15 include non-cementitious layer 167 embedded in coating 160. In these embodiments, non-cementitious layer 167 is between scratch layer 162 and main brown layer 166, but this is not meant to be limiting. Non-cementitious layer 167 can be adjacent any of the layers of coating 160 according to the invention. Non-cementitious layer 167 does not include cement. In the embodiments shown in FIG. 14 and FIG. 15, non-cementitious layer 167 is ceramic layer 167. In FIG. 15, ceramic layer 167 is composed of a ceramic material and fiberglass mesh 170. In some embodiments non-cementitious layer 167 is lead. In some embodiments non-cementitious layer 167 is plastic. Non-cementitious layer 167 can be any material or mixture that does not include cement. Non-cementitious layer 167 can be a carbon mixture or structure. Non-cementitious layer 167 can be formed of wood, plastic, metal, or other natural or man-made material, radiation shielding, EMI shielding, RFI shielding, ballistic protection layer or layers, or any combination of these or other elements that does not include cement.

Ceramic layer 167 is advantageous for use in coating 160 because ceramic layer 167 reflects and radiates heat, not allowing heat to transmit through building panel 112. Thus ceramic layer 167 provides thermal shielding and structural support to building panel 112.

Figure 16:
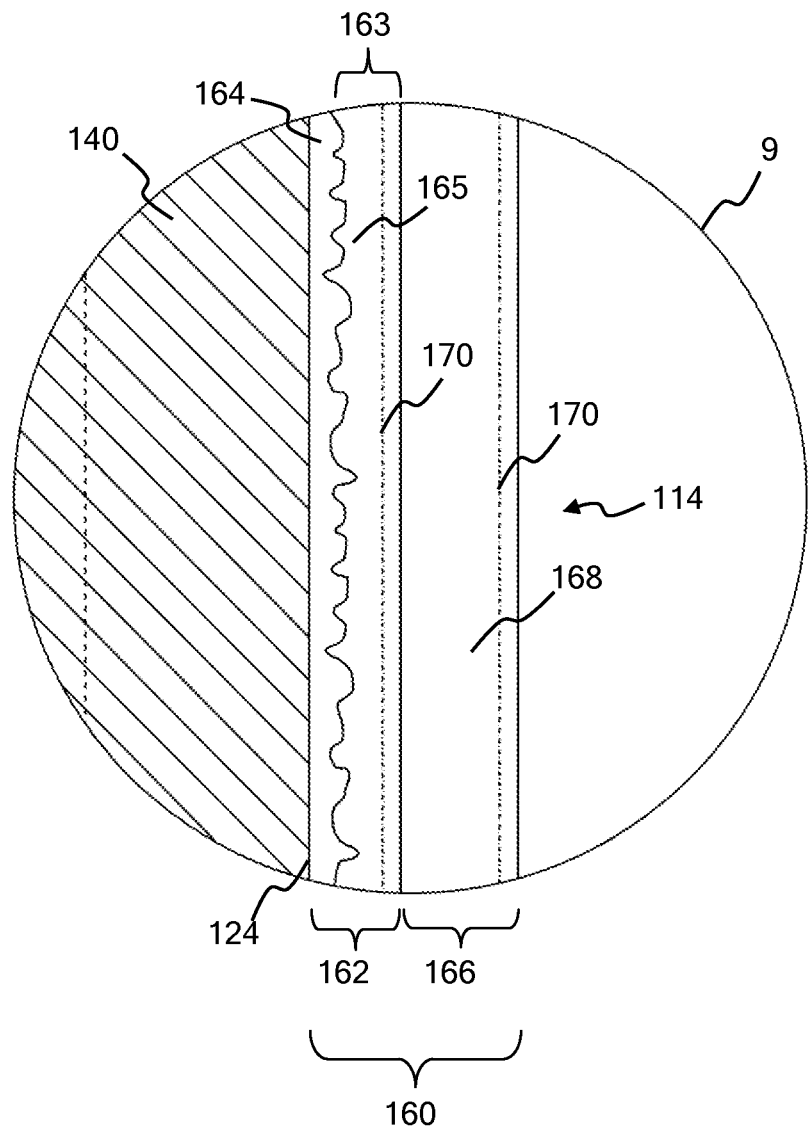
FIG. 16 shows a close-up cross-section of another embodiment of coating 160 according to the invention taken at section 9 of FIG. 10.

FIG. 16 shows a further embodiment of coating 160 according to the invention, where coating 160 includes two layers. In the embodiment shown in FIG. 16, coating 160 is formed of inner scratch layer 162 and outer main brown layer 166. Scratch layer 162 can include any of the materials, elements, or structures discussed in this document as possible constituents of a coating layer. Main brown layer 166 can include any of the materials, elements, or structures discussed in this document as possible constituents of a coating layer.

In some embodiments scratch layer 162 is formed of a plaster mixture. In some embodiments scratch layer 162 is formed of a gypsum plaster mixture. In some embodiments scratch layer 162 is formed of a cementitious mixture. In some embodiments scratch layer 162 includes a fiberglass mesh.

In some embodiments scratch layer 162 is a non-cementitious mixture. In some embodiments scratch layer 162 includes Portland cement and ceramic. In some embodiments scratch layer 162 includes Portland cement, acrylic bonder, and a ceramic aggregate. In some embodiments inner scratch layer 162 includes Portland cement, acrylic bonder, fiberglass strands, and a ceramic aggregate. In some embodiments scratch layer 162 includes Portland cement, acrylic bonder, fiberglass strands, a fiberglass mesh, and a ceramic aggregate. A ceramic material included in scratch layer 162 provides a thermal barrier, preventing heat from being absorbed by inner scratch layer 162, or transferred into building panel core 158 through inner scratch layer 162.

In the embodiment of coating 160 shown in FIG. 16, scratch layer 162 is a cementitious mixture that can be formed from many different components, as discussed above. In some embodiments scratch layer 162 is formed of cement, aggregate, and an acrylic bonder. In some embodiments scratch layer 162 includes a wire mesh embedded in the cementitious mixture. In some embodiments scratch layer 162 includes penetration-resistant materials, layers, or structures such as one or more than one projectile or ammunition-resistant material or structure. In some embodiments scratch layer 162 includes radiation blocking or inhibiting layers, materials, components, or structures. In some embodiments inner scratch layer 162 includes a layer, component or structure formed of lead. In some embodiments scratch layer 162 includes sound attenuating or inhibiting layers, materials, components, or structures. In some embodiments scratch layer 162 includes carbon fibers, carbon nanotubes, or carbon nanostructures. In some embodiments scratch layer 162 includes elements, structures, or materials that provide radio frequency shielding. In some embodiments scratch layer 162 includes elements, structures, or materials that provide electromagnetic interference shielding. In some embodiments scratch layer 162 is formed of other components. Further embodiments of inner scratch layer 162 will be discussed shortly.

Main brown layer 166 (also called outer main brown layer 166) can be formed of many different components or mixtures or layers, as discussed above. Main brown layer 166 can include any of the materials, elements, or structures discussed in this document as possible constituents of a coating layer. In some embodiments main brown layer 166 is formed of a plaster mixture. In some embodiments main brown layer 166 is formed of a gypsum plaster mixture. In some embodiments main brown layer 166 is formed of a cementitious mixture. In some embodiments main brown layer 166 is a non-cementitious mixture. In some embodiments main brown layer 166 includes Portland cement and ceramic. In some embodiments outer main brown layer 166 includes Portland cement, acrylic bonder, and a ceramic aggregate. In some embodiments main brown layer 166 includes Portland cement, acrylic bonder, fiberglass strands, and a ceramic aggregate. In some embodiments main brown layer 166 includes Portland cement, acrylic bonder, fiberglass strands, a fiberglass mesh, and a ceramic aggregate. A ceramic material included in outer main brown layer 166 provides a thermal barrier, preventing heat from being absorbed by main brown layer 166, or transferred into building panel core 158 through main brown layer 166. Ceramic included in main brown layer 166 provides a heat-reflecting layer, causing heat to be reflected off of main brown layer 166 instead of being absorbed by main brown layer 166.

In the embodiment of coating 160 shown in FIG. 16, main brown layer 166 is formed of brown mixture 168 and fiberglass mesh 170 embedded in brown mixture 168 while brown mixture 168 is still wet. Brown mixture 168 can take many different forms. In some embodiments brown mixture 168 is formed of a plaster mixture. In some embodiments brown mixture 168 is formed of a gypsum plaster mixture. In some embodiments brown mixture 168 is formed of a cementitious mixture. In the embodiment of coating 160 shown in FIG. 16, brown mixture 168 is a cementitious mixture made of cement, aggregate, acrylic bonder, and fiberglass strands. Brown mixture 168 components in this embodiment are mixed together with water to form a wet cementitious mixture, and applied over inner scratch layer 162 as a wet mixture. Often brown mixture 168 is trowelled onto scratch layer 162. Fiberglass mesh 170 is embedded in brown mixture 168 while it is still wet. In this way building panel 112 includes core 158, and coating 160 covering a portion of core 158, where coating 160 includes scratch layer 162 and main brown layer 166. Main brown layer 166 in the embodiment shown in FIG. 16 includes brown mixture 168 comprising cement, aggregate, acrylic bonder, and fiberglass strands; and fiberglass mesh 170. In some embodiments the aggregate in brown mixture 168 includes sand. In some embodiments the aggregate in brown mixture 168 includes ceramic. In some embodiments the aggregate in brown mixture 168 includes perlite. In some embodiments the aggregate in brown mixture 168 includes vermiculite. Perlite and vermiculite improve the fire-resistant qualities of building panel 112. Therefore perlite and/or vermiculite are used as aggregate in situations where a building panel structure 110 or a building panel 112 is required to possess stringent fire-resistant capabilities. Perlite and vermiculite also act as thermal filters, which increase the thermal efficiency of coating 160

In a particular embodiment brown mixture 168 is made by mixing together:

- 90 pounds of Portland cement (type 1 and 2)
- 90 pounds of 20 grit silica sand
- 90 pounds of 30 grit silica sand
- 1½ gallons of acrylic bonder, such as AC-100 from Dryvit
- 3 pounds of ¾" fiberglass strands
- 2½ gallons of potable water.

In this embodiment the brown mixture 168 aggregate is made of two sizes of sand, 20 grit sand and 30 grit sand. It is to be understood that larger or smaller batches can be made by increasing or decreasing the ingredient measurements proportionately. Fiberglass mesh 170 is embedded into brown mixture 168 as brown mixture 168 is applied to inner scratch layer 162 and while brown mixture 168 is still wet. This mixture has been found to provide superior structural integrity, water and weather protection, and a surface optimum for applying further finish coatings if desired. It is to be understood that brown mixture 168 can be made from other ingredients for specific structural uses.

The term acrylic bonder as used in this document refers to and includes all types of man-made binders, fillers and bonders such as urethane bonders, fillers and binders; polymer binders, fillers and bonders; copolymer binders, fillers and bonders; and other man-made or natural substances that perform the task of an acrylic bonder.

In some embodiments the fiberglass strands used in coatings according to the invention are replaced with other types of reinforcing fibers. In some embodiments synthetic fibers are used in place of or in addition to fiberglass strands. In some embodiments cellulosic fibers are used in place of or in addition to fiberglass strands. In some embodiments cotton fibers are used in place of or in addition to fiberglass strands. Cotton fibers provide the benefit of holding water in the coating mixture, which aids in the curing process, resulting in stronger, higher-quality coatings. In some embodiments other types of organic fibers are used in place of or in addition to fiberglass strands. In some embodiments glass fibers, wood fibers, plastic fibers, metal fibers, ceramic fibers, or other types of reinforcing fibers are used in place of or in addition to fiberglass strands. The fiberglass strands and/or other types of reinforcing strands described herein are used to provide strength and resistance to breaking and cracking to the coating. In addition, the fiberglass and/or other types of reinforcing strands aid in reducing slump and microcracking of the coating mixture in the first few days after application. The fiberglass strands in coatings according to the invention can be replaced with any type of strand or element that provides reinforcement and strength to withstand fracturing and breaking, or that controls mixture slump and microcracking In some embodiments the fiberglass mesh used in coatings according to the invention are replaced with other types of a reinforcing mesh structure. In some embodiments a fabric mesh is used in place of the fiberglass mesh in coatings according to the invention. In some embodiments a cellulosic fiber mesh is used in place of the fiberglass mesh in coatings according to the invention. In some embodiments a cotton or other type of organic matrix mesh is used in place of the fiberglass mesh in coatings according to the invention. Cotton fiber mesh provides the benefit of holding water in the coating mixture, which aids in the curing process, resulting in stronger, higher-quality coatings. In some embodiments a synthetic mesh is used in place of the fiberglass mesh in coatings according to the invention. In some embodiments a polymer or copolymer mesh is used in place of the fiberglass mesh in coatings according to the invention. In some embodiments a urethane mesh is used in place of the fiberglass mesh in coatings according to the invention. In some embodiments a matrix or mesh made of glass, wood, plastic, metal, ceramic, or other types of reinforcing material is used in place of or in addition to fiberglass mesh. The fiberglass mesh and/or other types of reinforcing matrix or mesh described herein are used to provide the coating with strength and resistance to breaking, cracking, and penetration. In addition, the fiberglass and/or other types of reinforcing matrix or mesh aid in reducing slump and microcracking of the coating mixture in the first few days after application. The fiberglass mesh in coatings according to the invention can be replaced with any type of mesh that provides reinforcement and strength to withstand fracturing, breaking, and/or penetration, and/or to control coating mixture slump and microcracking.

Scratch layer 162 can be formed of many different components, as discussed earlier. In some embodiments scratch layer 162 is a cementitious mixture applied over a wire mesh. In some embodiments scratch layer 162 is made up of multiple layers. In the embodiment of coating 160 shown in FIG. 16, scratch layer 162 is formed of two layers, first scratch layer A 164 and second scratch layer B 163. First scratch layer A 164 is a "dash" scratch coat which in this embodiment is machine sprayed onto core 158 as a wet mixture. In some embodiments first scratch layer A 164 is applied using other means. First scratch layer A 164 acts as a leveling coast in some embodiments, helping to keep the thickness of scratch layer 162 even over a wide area. First scratch layer A 164 acts as a key structure in some embodiments, which helps the other layers adhere well. First scratch layer A 164 acts as a mechanical key structure in some embodiments, providing mechanical structures for second scratch layer B 163 to hold on to. First scratch layer A 164 acts as a suction bond key structure in some embodiments, providing a layer that chemically bonds well to both EPS foam and second scratch layer B 163.

First scratch layer A 164 can be formed of many different components or mixtures or layers. First scratch layer A 164 can include any of the materials, elements, or structures discussed in this document as possible constituents of a coating layer. In some embodiments first scratch layer A 164 is formed of a plaster mixture. In some embodiments first scratch layer A 164 is formed of a gypsum plaster mixture. In some embodiments first scratch layer A 164 is formed of a cementitious mixture. In some embodiments first scratch layer A 164 includes a fiberglass mesh. In some embodiments first scratch layer A 164 includes Portland cement and ceramic. In some embodiments first scratch layer A 164 includes Portland cement, acrylic bonder, and a ceramic aggregate. In some embodiments first scratch layer A 164 includes Portland cement, acrylic bonder, fiberglass strands, and a ceramic aggregate. In some embodiments first scratch layer A 164 includes Portland cement, acrylic bonder, fiberglass strands, a fiberglass mesh, and a ceramic aggregate. A ceramic material included in first scratch layer A 164 provides a thermal barrier, preventing heat transfer into and out of building panel core 158.

In some embodiments first scratch layer A 164 includes penetration-resistant materials, layers, or structures such as one or more than one projectile or ammunition-resistant material or structure. In some embodiments first scratch layer A 164 includes radiation blocking or inhibiting layers, materials, components, or structures. In some embodiments first scratch layer A 164 includes a layer, component or structure formed of lead. In some embodiments first scratch layer A 164 includes sound attenuating or inhibiting layers, materials, components, or structures. In some embodiments first scratch layer A includes carbon fibers, carbon nanotubes, or carbon nanostructures. In some embodiments first scratch layer A includes elements, structures, or materials that provide radio frequency shielding. In some embodiments first scratch layer A includes elements, structures, or materials that provide electromagnetic interference shielding. In the embodiment of coating 160 shown in FIG. 16, first scratch layer A 164 is a cementitious mixture made of cement, aggregate, and acrylic bonder. In some embodiments the aggregate includes sand. In some embodiments the aggregate includes perlite. In some embodiments the aggregate includes ceramic. In some embodiments the aggregate includes vermiculite. In a specific embodiment first scratch layer A 164 is formed by mixing together:

90 pounds of Portland cement (type 1 and 2)
90 pounds of 20 grit silica sand
90 pounds of 30 grit silica sand
2½ gallons of acrylic bonder, such as AC-100 from Dryvit.
2½ gallons of potable water.

In this embodiment the first scratch layer A 164 aggregate is made of two sizes of sand, 20 grit sand and 30 grit sand. This first scratch layer A 164 mixture has been found to adhere well to EPS foam block and provide a superior surface for accepting further layers of coating 160. It is to be understood that larger or smaller amounts of first scratch layer A 164 can be made by proportionately increasing or decreasing the ingredients. In some embodiments first scratch layer A 164 has other ingredients and proportions. Usually first scratch layer A 164 is allowed to cure (dry) before adding other layers.

Second scratch layer B 163 can be formed of many different components or mixtures or layers. Second scratch layer B 163 can include any of the materials, elements, or structures discussed in this document as possible constituents of a coating layer. In some embodiments second scratch layer B 163 is formed of a plaster mixture. In some embodiments second scratch layer B 163 is formed of a gypsum plaster mixture. In some embodiments second scratch layer B 163 is formed of a cementitious mixture. In some embodiments second scratch layer B 163 includes a fiberglass mesh. In some embodiments second scratch layer B 163 includes Portland cement and ceramic. In some embodiments second scratch layer B 163 includes Portland cement, acrylic bonder, and a ceramic aggregate. In some embodiments second scratch layer B 163 includes Portland cement, acrylic bonder, fiberglass strands, and a ceramic aggregate. In some embodiments second scratch layer B 163 includes Portland cement, acrylic bonder, fiberglass strands, a fiberglass mesh, and a ceramic aggregate. A ceramic material included in second scratch layer B 163 provides a thermal barrier, preventing heat transfer into and out of building panel core 158.

In some embodiments second scratch layer B 163 includes penetration-resistant materials, layers, or structures such as one or more than one projectile or ammunition-resistant material or structure. In some embodiments second scratch layer B 163 includes radiation blocking or inhibiting layers, materials, components, or structures. In some embodiments second scratch layer B 163 includes a layer, component or structure formed of lead. In some embodiments second scratch layer B includes carbon fibers, carbon nanotubes, or carbon nanostructures. In some embodiments second scratch layer B 163 includes sound attenuating or inhibiting layers, materials, components, or structures. In some embodiments second scratch layer B includes elements, structures, or materials that provide radio frequency shielding. In some embodiments second scratch layer B includes elements, structures, or materials that provide electromagnetic interference shielding. In the embodiment of coating 160 shown in FIG. 16, second scratch layer B 163 is formed of brown mixture 165 and fiberglass mesh 170. Fiberglass mesh 170 is embedded in brown mixture 165 while brown mixture 165 is being trowelled or otherwise applied to first scratch layer A 164 and while brown mixture 165 is still wet. Brown mixture 165 can be trowelled onto the surface of first scratch layer A 164 or applied by any other means which will allow brown mixture 165 to cover first scratch layer A and mesh 170 to be embedded into brown mixture 165.

Brown mixture 165 can be formed of many different components or mixtures or layers. In some embodiment brown mixture 165 is formed of a plaster mixture. In some embodiments brown mixture 165 is the same mixture as brown mixture 168. In some embodiments brown mixture 165 is formed of a gypsum plaster mixture. In some embodiments brown mixture 165 is formed of a cementitious mixture. In some embodiments brown mixture 165 includes Portland cement and ceramic. In some embodiments brown mixture 165 includes Portland cement, acrylic bonder, and a ceramic aggregate. In some embodiments brown mixture 165 includes Portland cement, acrylic bonder, fiberglass strands, and a ceramic aggregate. In some embodiments brown mixture 165 includes Portland cement, acrylic bonder, fiberglass strands, a fiberglass mesh, and a ceramic aggregate. A ceramic material included in brown mixture 165 provides a thermal barrier, preventing heat transfer into and out of building panel core 158.

In the embodiment of coating 160 shown in FIG. 16, brown mixture 165 is a cementitious mixture made of cement, aggregate, acrylic bonder, and fiberglass strands. Brown mixture 165 components are mixed together with water to form a cementitious mixture, and applied to first scratch layer A 164 after first scratch layer A has cured. In some embodiments the aggregate in brown mixture 165 includes sand. In some embodiments the aggregate in brown mixture 165 includes perlite. In some embodiments the aggregate in brown mixture 165 includes vermiculite. In a particular embodiment brown mixture 165 is made by mixing together:

90 pounds of Portland cement (type 1 and 2)
90 pounds of 20 grit silica sand
90 pounds of 30 grit silica sand
1½ gallons of acrylic bonder, such as AC-100 from Dryvit
3 pounds of ¾" fiberglass strands
2½ gallons of potable water.

In this embodiment the brown mixture 165 aggregate is made of two sizes of sand, 20 grit sand and 30 grit sand. It is to be understood that larger or smaller batches can be made by increasing or decreasing the ingredient measurements proportionately. Fiberglass mesh 170 is embedded into brown mixture 165 while brown mixture 165 is still wet. This mixture has been found to provide superior structural integrity, water and weather protection, and a surface optimum for applying outer main brown layer 166. It is to be understood that brown mixture 165 can be made from other ingredients for specific structural uses. Usually second scratch layer B 163 is allowed to cure before adding other layers on top.

Coating 160, scratch layer 162, and main brown layer 166 can be made with many different thicknesses, depending on the specific use of building panel 112 and the structural strength needed. In some embodiments additional layers of scratch layer 162 and/or main brown layer 166 are added for additional strength. In some embodiments other layers are added. It is to be understood that finishing coatings are often applied to coating 160. These finishing coatings are applied for differing interior and exterior surface aesthetics and include paint, stucco, and other finishing layers and coatings.

In the embodiment shown in FIG. 16, scratch layer 162 is formed to be about 1/8" thick. Main brown layer 166 is formed to be about 1/4" thick. When these layers cure, coating 160 provides a smooth surface for applying finish coatings, and is structurally very strong, energy efficient, and lightweight. Composite building panel 112 with core 158 and coating 160 has greater flex strength and shear strength than other block panels due to the structured composite layers of core 158 and coating 160. This specific embodiment is used for walls, roofs, and beams of buildings and structure. Additional layers and other thicknesses can be used according to the invention for building panel 112 to achieve different panel strengths and uses.

In some embodiments control joints are cut into core 158 before coating 160 is applied. Holes and openings for windows and doors, access channels, and passageways for facilities and air handling can be cut into core 158 to create building panel 112 of a size and shape for the structure to be built. Core 158 and coating 160 can be easily formed into any size and shape structure, resulting in a lightweight, energy efficient, strong building panel 112.

FIG. 17 through FIG. 21 show embodiments of coating 560 according to the invention that can be used on building panel 112 in place of coating 160, or in addition to coating 160. In some embodiments coating 560 covers a portion of core 158 of building panel 112 according to the invention instead of coating 160. In some embodiments coating 560 covers a portion of insulating structural block 140 of building panel 112. Coating 560 is similar to coating 160 except that in coating 560, inner scratch layer 562 and outer main brown layer 566 are interdigitated, as shown in FIG. 17 through 21. Coating 560 can include any of the materials, elements, structures and/or layers discussed in this document as possible constituents of a coating. Similar numbers in FIG. 17 through FIG. 21 are used to designate similar elements as used earlier to describe coating 160. Interdigitated means that inner scratch layer 562 (also called scratch layer 562) and outer main brown layer 566 (also called main brown layer 566) each have crests and valleys (grooves) which interlock with each other Inner scratch layer 562 and outer main brown layer 566 are interdigitated for a number of reasons. Forming inner scratch layer 562 with crests 572 and valleys 574 allows inner scratch layer 562 to be used as a screed for outer main brown layer 566. This helps to keep the thickness of coating 560 uniform across building panel 112. Scratch layer 562 can be formed with crests 572 of a certain height above core 158. The crests 572 are then used as a screed for main brown layer 566, ensuring that the overall thickness of coating 560 is uniform. In addition, interdigitating inner scratch layer 562 and outer main brown layer 566 adds to the strength and structural integrity of building panel 112 Inner scratch layer 562 and outer main brown layer can have different elements comprising the layer so that each layer can be optimized for different purposes if desired. On layer can be optimized to reflect sunlight or heat, for example. One layer can be optimized to have a high thermal resistance. One of the layers can be optimized for radiation protection or any of the other types of protection that layers of coating 160 or 560 can provide.

Coating 560 can include any of the materials, elements, or structures discussed in this document as possible constituents of a coating layer. Coating 560 can include any of the materials, elements, structures, or layers discussed with regard to coating 160 and/or the individual layers of coating 160. In some embodiments coating 560 includes cement and ceramic. In some embodiments coating 560 includes cement, acrylic bonder, and a ceramic aggregate. In some embodiments coating 560 includes cement, acrylic bonder, fiberglass strands, and a ceramic aggregate. In some embodiments coating 560 includes cement, acrylic bonder, fiberglass strands, a fiberglass mesh, and a ceramic aggregate. A ceramic material included in coating 560 creates a thermal barrier layer, which helps coating 560 to prevent heat transfer into and out of building panel core 158.

In some embodiments coating 560 includes penetration-resistant materials, layers, or structures such as one or more than one projectile or ammunition-resistant material or structure. In some embodiments coating 560 includes radiation blocking or inhibiting layers, materials, components, or structures. In some embodiments coating 560 includes a layer, component or structure formed of lead. In some embodiments coating 560 includes carbon fibers, carbon nanotubes, or carbon nanostructures. In some embodiments coating 560 includes sound attenuating or inhibiting layers, materials, components, or structures. In some embodiments coating 560 includes elements, structures, or materials that provide radio frequency shielding. In some embodiments coating 560 includes elements, structures, or materials that provide electromagnetic interference shielding.

In the embodiment of coating 560 shown in FIG. 17 through FIG. 21, coating 560 includes inner scratch layer 562, where inner scratch layer 562 includes two layers, first scratch layer A 564 and second scratch layer B 563. First scratch layer A 564 is a cementitious mixture that includes fiberglass mesh 570 in this embodiment, as shown in FIG. 17 through FIG. 21. Scratch layer 562 in some embodiments is a single layer. Scratch layer 562 can include any of the materials, elements, or structures discussed in this document as possible constituents of a coating layer. Scratch layer 562 can include any of the materials, elements, structures, or layers discussed with regard to scratch layer 162 and/or the individual layers of scratch layer 162.

First scratch layer A 564 can include any of the materials, elements, or structures discussed in this document as possible constituents of a coating layer. First scratch layer A 564 can include any of the materials, elements, structures, or layers discussed with regard to first scratch layer A 164. In some embodiments first scratch layer A 564 includes fiberglass mesh 570. In some embodiments first scratch layer A 564 does not include fiberglass mesh 570. First scratch layer A 564 in some embodiments includes the same components as first scratch layer A 164 discussed earlier. In some embodiments first scratch layer A 564 has a different composition than first scratch layer A 164.

In some embodiments first scratch layer A 564 includes cement and a ceramic material. In some embodiments first scratch layer A 564 includes cement, acrylic bonder, and aggregate. In some embodiments first scratch layer A 564 includes cement, acrylic bonder, fiberglass strands, and aggregate. In some embodiments first scratch layer A 564 includes cement, acrylic bonder, fiberglass strands, a fiberglass mesh, and aggregate. In some embodiments the aggregate includes ceramic. A ceramic material included in first scratch layer A 564 provides a thermal barrier, preventing heat transfer into and out of building panel core 158.

In some embodiments first scratch layer A 564 includes penetration-resistant materials, layers, or structures such as one or more than one projectile or ammunition-resistant material or structure. In some embodiments first scratch layer A 564 includes radiation blocking or inhibiting layers, materials, components, or structures. In some embodiments first scratch layer A 564 includes a layer, component or structure formed of lead. In some embodiments first scratch layer A 564 includes carbon fibers, carbon nanotubes, or carbon nanostructures. In some embodiments first scratch layer A 564 includes sound attenuating or inhibiting layers, materials, components, or structures. In some embodiments first scratch layer A 564 includes elements, structures, or materials that provide radio frequency shielding. In some embodiments first scratch layer A 564 includes elements, structures, or materials that provide electromagnetic interference shielding.

Figure 17:
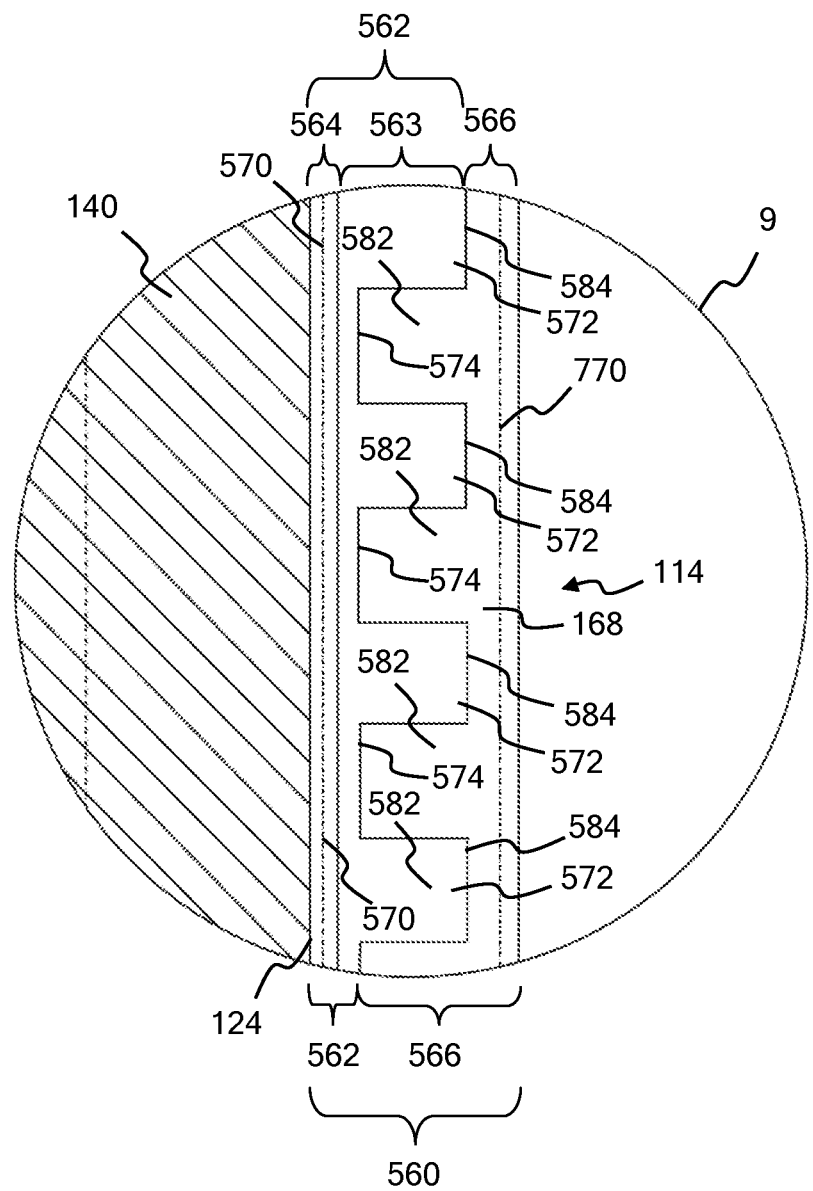
FIG. 17 shows a close-up cross-section of an embodiment of coating 560 according to the invention that can be used on building panel 112 of FIG. 10 instead of coating 160.
Figure 18:
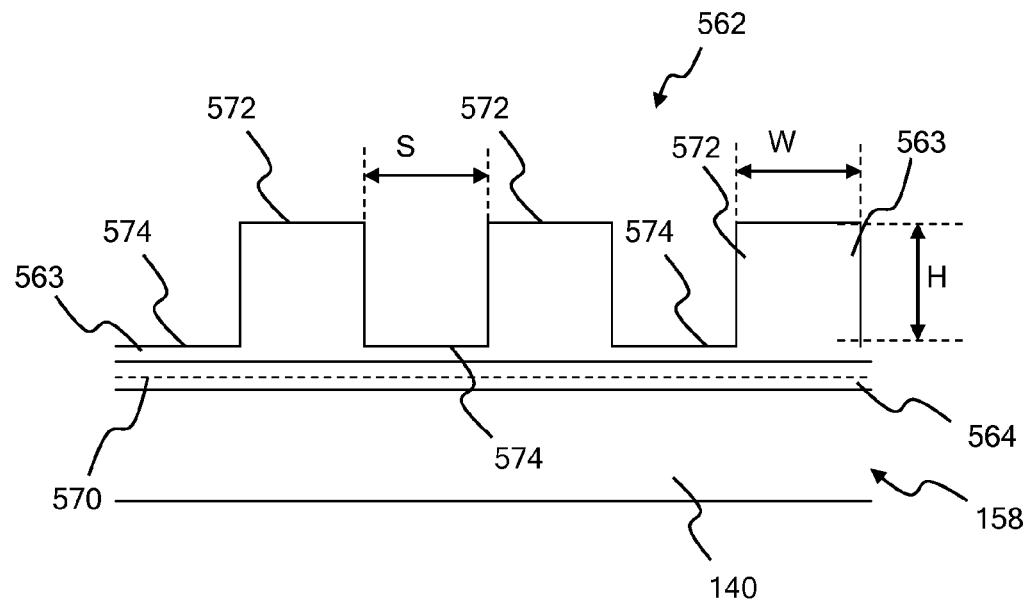
FIG. 18 shows a cross section of an embodiment of inner scratch layer 562 according to the invention, where second scratch layer B 563 has crests 572 and valleys (grooves) 574.
Figure 19:
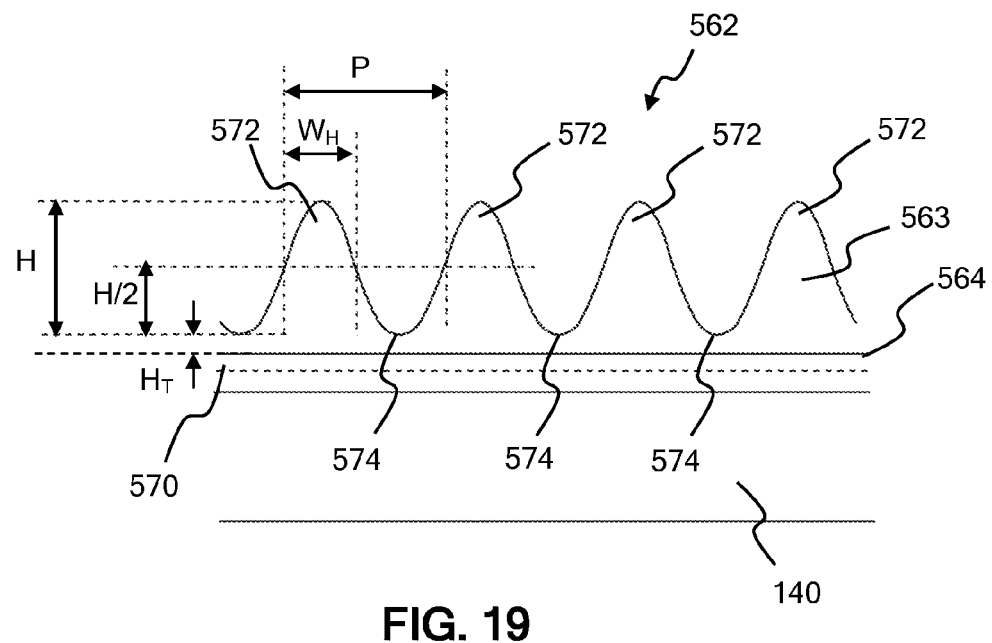
FIG. 19 shows scratch layer 562 of FIG. 18 after the wet scratch layer 562 coating mixture material has slumped and settled, which results in the rounding off of crests 572 and valleys 574 into more curvilinear shapes as shown in FIG. 19, and showing the height H, half-width $W_H$, and period P of crests 572.
Figure 20:
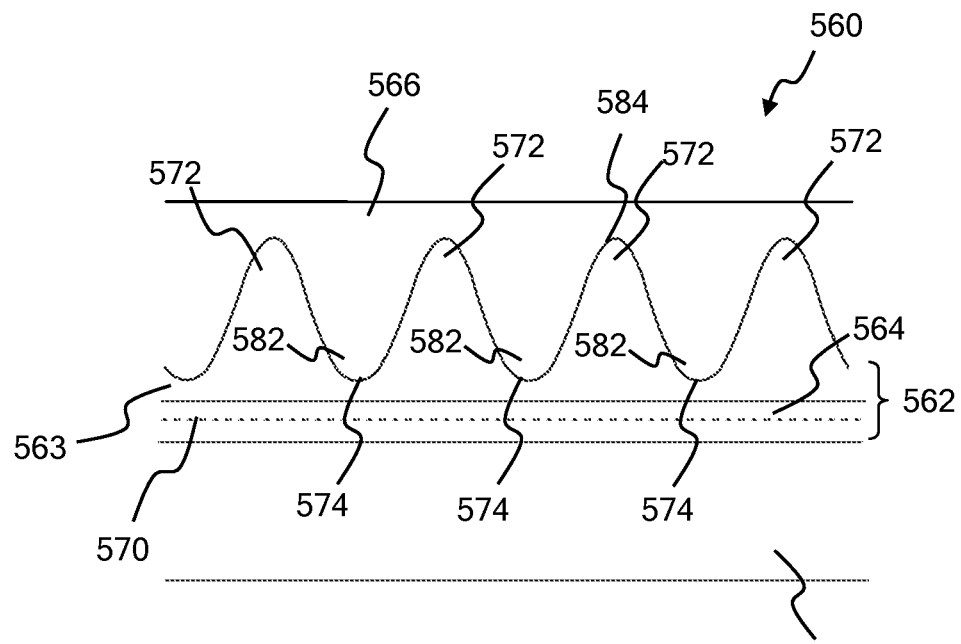
FIG. 20 shows a cross-section of an embodiment of coating 560 according to the invention, where main brown layer 566 has been applied over inner scratch layer 562 of FIG. 19.
Figure 21:
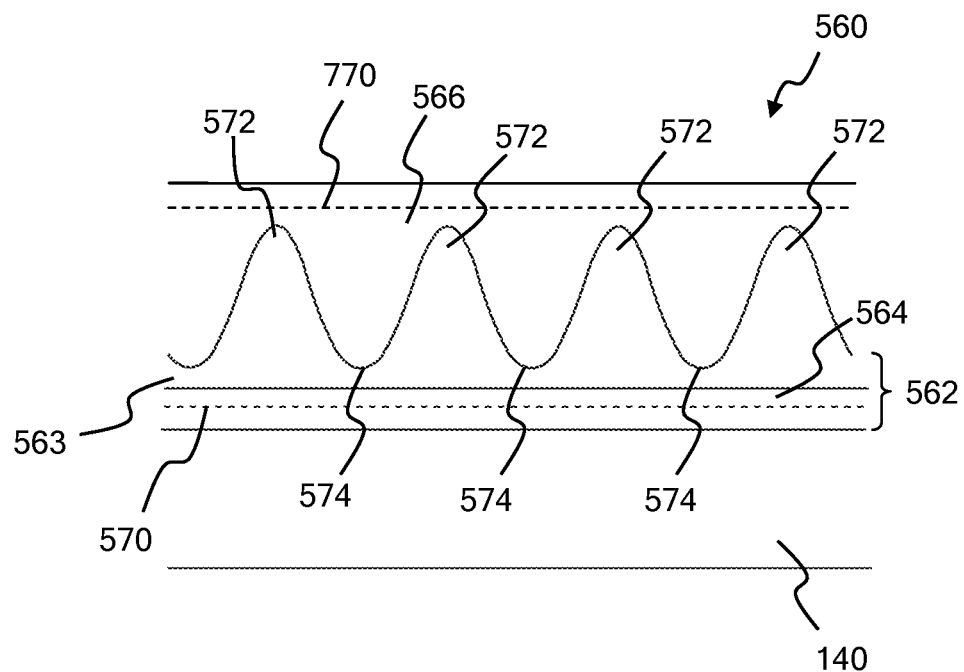
FIG. 21 shows a cross section of an embodiment of coating 560 according to the invention, where main brown layer 566 has been applied over scratch layer 562 of FIG. 19, and fiberglass mesh 770 has been embedded in main brown layer 566 while main brown layer 566 is still wet.

Second scratch layer B 563 can include any of the materials, elements, or structures discussed in this document as possible constituents of a coating layer. Second scratch layer B 563 can include any of the materials, elements, structures, or layers discussed with regard to second scratch layer B 163. Second scratch layer B 563 is a cementitious mixture that is formed such that it includes crests 572 and valleys 574 (also called grooves 574) in the embodiment shown in FIG. 17 through FIG. 21. Crests 572 and valleys 574 are formed in second scratch layer B 563 by any number of methods, including trowelling second scratch layer B 563 with a shaped trowel while second scratch layer B 563 is still wet. It is to be understood, however, that crests 572 and valleys 574 can be formed in second scratch layer B 563 in many different ways. Second scratch layer B 563 is then allowed to cure (dry) before outer main brown layer 566 is applied. Second scratch layer B 563 is shaped with crests 572 and valleys 574 with special tools for compacting and shaping the second scratch layer B 563 mixture while it is still wet. These tools are described in more detail in U.S. patent application Ser. No. 61/721,175 filed Nov. 1, 2012 to John E. Propst. It is to be noted that these tools are not used to remove some of the wet mixture material as much as they are used to compress and shape the wet mixture material into crests 572 and valleys 574. Material is not removed from valleys 574, but instead the wet mixture material is compressed and shaped into crests 572 and valleys 574. Compressing the wet mixture material releases water from the material and allows it to cure faster and stronger. The resulting cured coating is stronger, with smooth curvilinear crests 572 and valleys 574. A smooth curvilinear surface resists cracking better than a surface that has been roughened or had material removed from it. Crests 572 are shaped with tools to have a smooth rectilinear shape as shown in FIG. 18, but as the material cures it slumps into crests 572 with a smooth curvilinear surface as shown in FIG. 19 through FIG. 21. Valleys 574 are shaped with tools to have a smooth rectilinear shape as shown in FIG. 18, but as the material cures it slumps into valleys 574 with a smooth curvilinear surface as shown in FIG. 19 through FIG. 21. In this embodiment crests 572 and valleys 574 cure into a smooth curvilinear shape that is an approximation of a sine wave, as shown in FIG. 19 through FIG. 21, but this particular smooth curvilinear shape is not the only shape that can be used.

FIG. 18 shows an example cross-section of scratch layer 562, where scratch layer 562 includes first scratch layer A 564 and second scratch layer B 563. In this embodiment second scratch layer B 563 includes crests 572 and valleys 574. In the embodiment shown in FIG. 18, the wet second scratch layer B 563 mixture is smoothed and shaped to have crests 572 in a rectilinear cross-section. In the embodiment shown in FIG. 18, crests 572 have a width W and height H, and valleys 574 form a spacing S between each crest 572. In some embodiments crests 572 are formed to have a width W of between about ⅛ inch and about ¾ inch. In some embodiments crests 572 are formed to have a width W of about ⅜ inch. Forming crests 572 with these sizes has been found to provide a coating layer with superior strength. In addition, crests 572 are then able to be a screed layer for outer main brown layer 566. In some embodiments crests 572 are formed to have a height H of between about ⅛ inch and about ¾ inch. In some embodiments crests 572 are formed to have a height H of about ⅜ inch. In some embodiments crests 572 are formed to have a spacing S of between about ⅛ inch and about ¾ inch. In some embodiments crests 572 are formed to have a spacing S of about ⅜ inch. Forming crests 572 and valleys 574 with these sizes has been found to provide a coating layer with superior strength and ability to withstand cracking, and to provide a strong base for main brown layer 566. Main brown layer 566 can be applied over second scratch layer B 563 with a uniform thickness over a wide area because crests 572 are used as a screed reference layer for main brown layer 566.

Crests 572 and valleys 574, when dry, often have a rounded or smooth curvilinear cross section as is shown in FIG. 19, due to slumping, settling, and smoothing of wet second scratch layer B 563 material as it dries, or cures. FIG. 19 through FIG. 21 show cross sections of embodiments of scratch layer 562 and coating 560 in which crests 572 and valleys 574 have a smooth curvilinear surface. A curvilinear surface is advantageous because it does not have points and sharp corners to crack, resulting in a stronger cured layer. FIG. 19 shows how the structure of crests 572 are measured in these embodiments, showing that crests 572 have height H and half width $W_H$. Half-width $W_H$ is the width $W_H$ of crests 572 measured between the two points where crest 572 is at half of its height, or H/2. Crests 572 also have period P, which is the repeating distance, or distance from any point to the point where the periodic structure repeats itself Second scratch layer B 563 is shaped such that valleys 574 are height $H_T$ above first scratch layer A 564, as shown in FIG. 19. In other words valley 574 does not extend through second scratch layer B 563, but has a thickness $H_T$ of second scratch layer B 563 material between the bottom of each valley 574 and first scratch layer A 564. This is advantageous because it makes second scratch layer B 563 stronger due to second scratch layer B 563 being a continuous layer, as opposed to having lines of material that form the peaks 572, and valleys 574 extending through to first scratch layer A 564. Separate lines of material tend to break and crack at the junctions of the material. But these junctions do not exist in second scratch layer B 563 according to the invention. Second scratch layer B 563 material is applied in a thickness great enough to allow the shaping of peaks 572 and valleys 574 in second scratch layer B 563, while leaving valleys 574 a height $H_T$ above first scratch layer A 564. This method and geometry of forming first scratch layer A 564 and second scratch layer B 563 results in a structurally strong scratch layer 562 that resists cracking and breaking apart. In some embodiments height $H_T$ is greater than 1/16". In some embodiments height $H_T$ is greater than ⅛". In some embodiments height $H_T$ is greater than 3/16". In some embodiments height $H_T$ is greater than ¼".

In some embodiments crests 572 have an average half width $W_H$ of between 1/16 inch and ¾ inch once scratch layer 562 dries (cures). The average half-width $W_H$ is the average of the individual half-widths $W_H$ of a plurality of crests 572 formed in scratch layer 562. Any individual crest 572 may have other measurements due to defects or issues in forming or drying of inner scratch layer 562, but the measurements of each crest 572 is often fairly close and the average of their measurements provides a good measure of the size of the plurality of crests 572. In some embodiments crests 572 have an average half width $W_H$ of between ⅛ inch and ⅝ inch once scratch layer 562 dries. Forming crests 572 and valleys 574 with these sizes has been found to provide a coating layer with superior strength and ability to withstand cracking, and to provide a strong base for main brown layer 566.

In some embodiments, crests 572 as shown in FIG. 19 through FIG. 21 are formed to have an average height H of between about ⅛ inch and about ¾ inch. In some embodiments crests 572 are formed to have an average height H of about 5/16 inch. In some embodiments crests 572 are formed to have an average height H of about ¼ inch. The average height H is the average of the individual heights H of a plurality of crests 572 formed in scratch layer 562. Any individual crest 572 may have other measurements due to defects or issues in forming or drying of inner scratch layer 562, but the measurements of each crest 572 is often fairly close and the average of their measurements provides a good measure of the size of the plurality of crests 572. Forming crests 572 and valleys 574 with these sizes has been found to provide a coating layer with superior strength and ability to withstand cracking, and to provide a strong base for main brown layer 566.

In some embodiments crests 572 have an average period P of between ¼ inch and 1½ inch once inner scratch layer 562 dries. The average period P is the average of the individual periods P of a plurality of crests 572 formed in inner scratch layer 562. Any individual crest 572 may have other measurements due to defects or issues in forming or drying of inner scratch layer 562, but the measurements of each crest 572 is often fairly close and the average of their measurements provides a good measure of the size of the plurality of crests 572. In some embodiments crests 572 have an average period P of between ½ inch and 1¼ inch once scratch layer 562 dries. Forming crests 572 and valleys 574 with these sizes has been found to provide a coating layer with superior strength and ability to withstand cracking, and to provide a strong base for main brown layer 566.

In some embodiments second scratch layer B 563 includes cement and acrylic bonder. In some embodiments second scratch layer B 563 includes cement, acrylic bonder, and aggregate. In some embodiments the aggregate is ceramic. In some embodiments second scratch layer B 563 includes cement, acrylic bonder, fiberglass strands, and aggregate. In some embodiments second scratch layer B 563 includes cement, acrylic bonder, fiberglass strands, a fiberglass mesh, and aggregate. In some embodiments second scratch layer B 563 includes cement, acrylic bonder, fiberglass strands, a fiberglass mesh, ceramic, and aggregate. In some embodiments the cement included in second scratch layer B 563 is Portland cement. A ceramic material included in second scratch layer B 563 creates a second scratch layer B 563 that is a thermal barrier, such that heat is reflected off of second scratch layer B 563 and heat is prevented from transferring into and out of building panel core 158.

In some embodiments second scratch layer B 563 includes penetration-resistant materials, layers, or structures such as one or more than one projectile or ammunition-resistant material or structure. In some embodiments second scratch layer B 563 includes radiation blocking or inhibiting layers, materials, components, or structures. In some embodiments second scratch layer B 563 includes a layer, component or structure formed of lead. In some embodiments second scratch layer B 563 includes carbon fibers, carbon nanotubes, or carbon nanostructures. In some embodiments second scratch layer B 563 includes sound attenuating or inhibiting layers, materials, components, or structures. In some embodiments second scratch layer B 563 includes elements, structures, or materials that provide radio frequency shielding. In some embodiments second scratch layer B 563 includes elements, structures, or materials that provide electromagnetic interference shielding.

Main brown layer 566 can be applied over second scratch layer B 563 with a uniform thickness over a wide area because crests 572 are used as a screed reference layer for main brown layer 566, as shown in FIG. 20 and FIG. 21. A screed reference is a fixed height reference which the applicator can use to set the height of an applied coating mixture. Second scratch layer B 563 has been allowed to cure (dry), and so crests 572 are solid crests with a uniform height. The crests 572 are used as a screed to keep the thickness of main brown layer 566 uniform over a large area. In some embodiments fiberglass mesh 770 is embedded in main brown layer 566 while main brown layer 566 is still wet, as shown in FIG. 21.

Main brown layer 566 can include any of the materials, elements, or structures discussed in this document as possible constituents of a coating layer. Main brown layer 566 can include any of the materials, elements, structures, or layers discussed with regard to main brown layer 166. Main brown layer 566 is a cementitious mixture in the embodiment shown in the figures.

In some embodiments main brown layer 566 includes cement and aggregate. In some embodiments main brown layer 566 includes cement and acrylic bonder. In some embodiments main brown layer 566 includes cement and ceramic. In some embodiments main brown layer 566 includes cement, acrylic bonder, and a ceramic aggregate. In some embodiments outer main brown layer 566 includes cement, acrylic bonder, fiberglass strands, and aggregate. In some embodiments main brown layer 566 includes cement, acrylic bonder, fiberglass strands, a fiberglass mesh, and aggregate. In some embodiments the aggregate includes ceramic. A ceramic material included in main brown layer 566 provides a thermal barrier, reflecting heat away from main brown layer 566 and preventing heat transfer into building panel core 158.

In some embodiments main brown layer 566 includes penetration-resistant materials, layers, or structures such as one or more than one projectile or ammunition-resistant material or structure. In some embodiments main brown layer 566 includes radiation blocking or inhibiting layers, materials, components, or structures. In some embodiments main brown layer 566 includes a layer, component or structure formed of lead. In some embodiments outer main brown layer 566 includes carbon fibers, carbon nanotubes, or carbon nanostructures. In some embodiments main brown layer 566 includes sound attenuating or inhibiting layers, materials, components, or structures. In some embodiments main brown layer 566 includes elements, structures, or materials that provide radio frequency shielding. In some embodiments main brown layer 566 includes elements, structures, or materials that provide electromagnetic interference shielding Main brown layer 566 is applied to scratch layer 562 after scratch layer 562 has cured. Main brown layer 566 in this embodiment includes brown mixture 168 and fiberglass mesh 770. Brown mixture 168 of outer main brown layer 566 can be applied in many different ways, including but not by way of limitation trowelling or spraying. Brown mixture 168 in this embodiment is trowelled over scratch layer 562 such that outer main brown layer 566 fills in valleys 574 with brown mixture 168, creating main brown layer crests 582 and main brown layer valleys 584 (also called main brown layer grooves 584) as shown in FIG. 17 and FIG. 20. In this way scratch layer 562 and main brown layer 566 are interdigitated. Each of a plurality of scratch layer crests 572 reside in a corresponding one of a plurality of main brown layer valleys 584. And each of a plurality of main brown layer crests 582 reside in a corresponding one of a plurality of scratch layer valleys 574. It is to be understood that scratch layer crests 572 and main brown layer crests 582 can be compressed and shaped, or formed, to be any shape, including but not limited to half-spheres, rectangular, half-oval, triangular, or any other shape or cross-section. And it is to be understood that scratch layer valleys 574 and main brown layer valleys 584 can be any shape, including but not limited to half-spheres, rectangular, half-oval, triangular, or any other shape or cross-section.

Interdigitation of scratch layer 562 and main brown layer 566 provides several advantages. One advantage is that interdigitation can increase the structural strength of building panel 112. Another advantage is that crests 572 in scratch layer 562 provide a thickness reference screed for main brown layer 566. It is often difficult to maintain a uniform coating thickness across a large building panel surface. Crests 572 provide a built-in screed for main brown layer 566, allowing the thickness of outer main brown layer 566 and coating 560 to be uniform across a wide surface area. Fiberglass mesh 770 is embedded in outer main brown layer 566 while outer main brown layer 566 is still wet in some embodiments.

In a particular embodiment of coating 560 according to the invention, one or more of the layers included in coating 560 includes ceramic material in the coating mixture, as mentioned above. Including ceramic material in coating 560 creates a coating 560 that acts as a thermal barrier, reflecting heat away from coating 560 instead of absorbing heat through coating 560. When main brown layer 566 includes ceramic material, heat is reflected off of coating 560. Coating 560 will remain cool for a long time even when subjected to high temperatures, intense sunlight, and even fire or other direct heat sources. This results in a coating 560 and a building panel 112 which has increased thermal resistance, better insulating qualities, and high fire resistance. In some embodiments non-cementitious layer 167 is included in coating 160 or coating 560.

FIG. 17 through FIG. 21 show particular embodiments of coating 560 where second scratch layer B 563 and main brown layer 566 are interdigitated, but it is to be understood that this is an example embodiment only and not meant to be limiting. Any two layers included in coating 160 or coating 560 according to the invention can be interdigitated as described above. In some embodiments scratch layer 162 and main brown layer 166 of coating 160 are interdigitated. Any two layers of coating 160 or coating 560 can be interdigitated according to the strength and thickness uniformity requirements of the coating layer.

FIG. 1, FIG. 2, and FIG. 8 through FIG. 10 show building panel structure 110 according to the invention, including building panel 112. Building panel 112 includes core 158 and coating 160 covering a portion of core 158. Coating 160 can take many forms, including those shown in FIG. 11 through FIG. 16. Building panel 112 of FIG. 1, FIG. 2, and FIG. 8 through FIG. 10 can include coating 560 of FIG. 17 through FIG. 21 instead of coating 160. Building panel 112 as shown in FIG. 1, FIG. 2, and FIG. 8 through FIG. 10 can include any coating according to the invention to cover a portion of core 158. A building panel structure is any structure built using one or more than one building panel as an element in the structure. Building panel structure 110 in the embodiment shown in FIG. 1, FIG. 2, and FIG. 8 through FIG. 10 includes building panel 112 and footer 190. Building panel 112 in this embodiment has building panel interlock element 154, which in this embodiment is building panel groove 154, as shown FIG. 10. Footer 190 has integral footer interlock element 194, which in this embodiment is footer tongue 194. Footer tongue 194 couples with building panel groove 154 to couple building panel 112 to footer 190. Footer interlock element 194 is integral to footer 190 because footer tongue 194 and footer 190 are one integral piece. In this embodiment footer 190 and footer tongue 194 are both made of concrete. Footer tongue 194 is poured together with footer 190 so that footer 190 and footer tongue 194 are one integral piece. Footer tongue 194 not only provides a coupling for building panel 112, footer tongue 194 also stops moisture, water, weather, and other elements from penetrating the interface between building panel 112 and footer tongue 194. In some embodiments footer 190 and footer tongue 194 are poured along the exterior edge of a structure. After building panels 112 are coupled to footer 190 to create building structure 110, even if water, moisture, or other elements penetrate the outer interface between building panel 112 and footer 190, they cannot "climb" footer tongue 194 to get to the other side of building panel 112. In this way integral footer tongue 194 provides moisture and weather protection for building panel structure 110.

Building panel interlock element 154 can take many different forms. In some embodiments building panel interlock element 154 is a building panel tongue. In some embodiments building panel interlock element 154 has a form other than a tongue or a groove. In some embodiments building panel groove 154 or footer tongue 194 have barbs, spikes, hooks or other surface effects which help to hold footer tongue 194 in building panel groove 154.

Footer interlock element 194 can take many different forms. In some embodiments footer interlock element 194 is a footer groove. In some embodiments footer interlock element 194 takes a form other than a tongue or a groove.

In the embodiment shown in FIG. 1, FIG. 2, and FIG. 8 through FIG. 10, building panel structure 110 is constructed by first pouring concrete footer 190, including integral footer tongue 194, as a single pour. In some embodiments footer 190 is poured in multiple pours. Footer 190 and footer tongue 194 are formed using any method which results in footer 190 and footer tongue 194 being one integral concrete piece. Concrete foundation 192 is often poured next. In some embodiments concrete foundation 192 and concrete footer 190 are formed at the same time in one concrete pour. Building panel 112 is coupled to footer 190 using footer tongue 194 and building panel groove 154. Building panel 112 can be constructed and coupled to footer 190 in many different ways. In this embodiment building panel 112 is constructed on-site and on footer 190. Core 158 is built on footer 190 and connected to footer 190. In this embodiment frame 130 is built and connected to footer 190 using bolts 188 as shown in FIG. 8. Shaped blocks 140 of core 158 are coupled to frame 130, to each other, and to footer tongue 194 to create core 158 coupled to footer 190 using footer tongue 194 and building panel groove 154. Coating 160, coating 560, or any coating according to the invention, is applied to a portion of core 158. In this embodiment coating 160 is applied to front surface 124 of core 158 to create first surface 114 of building panel 112, and coating 160 is applied to rear surface 126 of core 158 to create second surface 116 of building panel 112 as shown. In some embodiments coating 160 is applied to core 158 and footer 190.

Building panel 112 in this embodiment has coating 160 applied to two surfaces, front surface 124 and rear surface 126, of core 158. In some embodiments coating 160 is applied to only one surface of core 158. In some embodiments coating 160 is applied to all surfaces of core 158. Coating 160 can be applied to any surface or portion of core 158 to create building panel 112 according to the invention. In some embodiments of building panel 112 and/or building panel structure 110, coating 560 as shown in FIG. 17 through FIG. 21 is used instead of coating 160. In some embodiments of building panel 112 and/or building panel structure 110, a different coating according to the invention is used instead of coating 160.

In some embodiments of building panel structure 110, core 158 is built and covered with coating 160 to create building panel 112 before being coupled to footer 190. In some embodiments building panel 112 is made off-site and shipped to the building site to be coupled to footer 190.

In the embodiment shown in FIG. 1, FIG. 2, and FIG. 8 through FIG. 10, building panel 112 is made in-place on footer 190 as described above. Multiple building panels 112 can be added to composite building panel structure 110 to create walls, ceilings, floors, beams, bridges, or any other desired structure. In this embodiment composite building panel 112 forms part of building panel structure 110 which is a house. In other embodiments building panel 112 forms parts of other structures and buildings in accordance with building panel structure 110. In some embodiments building panel structure 110 is a building. In other embodiments building panel structure 110 is a bridge. In some embodiments building panel structure 110 is a structure. Building panel structure 110 is any building, structure, or edifice of any shape, size or use which is formed of at least one building panel according to the invention.

Building panel structure 110 as shown in FIG. 1, FIG. 2, and FIG. 8 through FIG. 10 is structurally sound as soon as coating 160 dries, and there is no need for external structural elements to hold building panel 112 in place while the rest of building panel structure 110 is created. In other types of foam block panel construction, for example, the foam block walls cannot support themselves until the entire structure is created and fitted together. The walls need to be supported by external structural elements during construction. These external structural elements used to hold the structure together during construction are not necessary when using building panel 112 according to the invention. Building panels 112 formed each day as part of building panel system 110 are structurally sound and secure as soon as coating 160 dries, and each day whatever part of the complete structure has been completed is strong and secure and not in danger of collapsing.

Building panel 112 in this embodiment is stronger than other types of foam block walls. Core 158 and coating 160 and/or coating 560 give building panel structure 110 the strength to both hold building panel 112 secure during construction and withstand strong environmental elements and forces during the lifetime of the building 110, such as wind and earth movement. Building panel 112 is environmentally friendly, creating an energy efficient structure using recyclable material with less waste.

Figure 22:
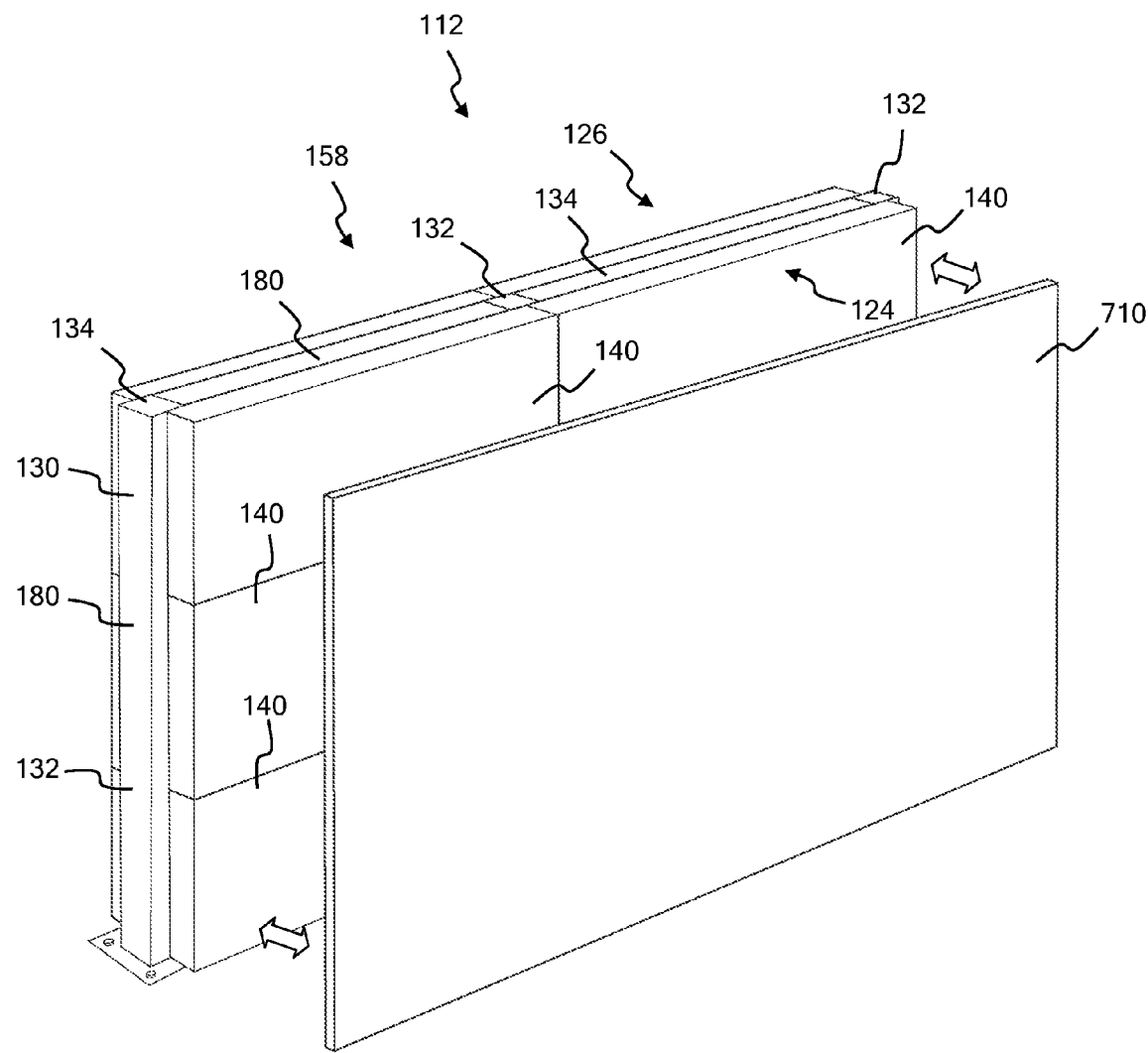
FIG. 22 shows how coatings 160 or 560 can be made separate from core 158 such that coatings 160 or 560 form construction board 710 according to the invention.

In some embodiments of building panel 112 according to the invention, coatings 160 or coatings 560 are formed into construction board 710 according to the invention before being coupled to core 158, as shown in FIG. 22. Construction board 710 is formed of the same materials and layers as any of the embodiments of coating 160 or coating 560, but these materials are shaped and cured into a dry mixture board 710 before being coupled to core 158. This allows construction board 710 to be formed off-site and prior to forming core 158, for example. Construction board 710 can be coupled to core 158 using many different attachment means and methods. In some embodiments construction board 710 is coupled to core 158 using a suction bond, not by mechanical attachments. Construction board 710 can be coupled to core 158 using an acrylic bonder or other elastomeric polymer or cementitious mixture of liquid bonding material. In some embodiments some of the layers of coating 160 or 560 are applied to core 158 as a liquid mixture and allowed to cure, and some of the layers are formed into a solid dry mixture as construction board 710 and then adhered to the layers of coating 160 or 560 previously applied to core 158. In some embodiments the wet mixture layers of coating 160 or 560 are used to adhere the dry mixture layers to core 158. Coating 160 and coating 560 as described in this document can be applied to core 158 in any combination of wet and dry layers, where the dry layer(s) form construction board 710 prior to being applied to core 158.

Figure 23:
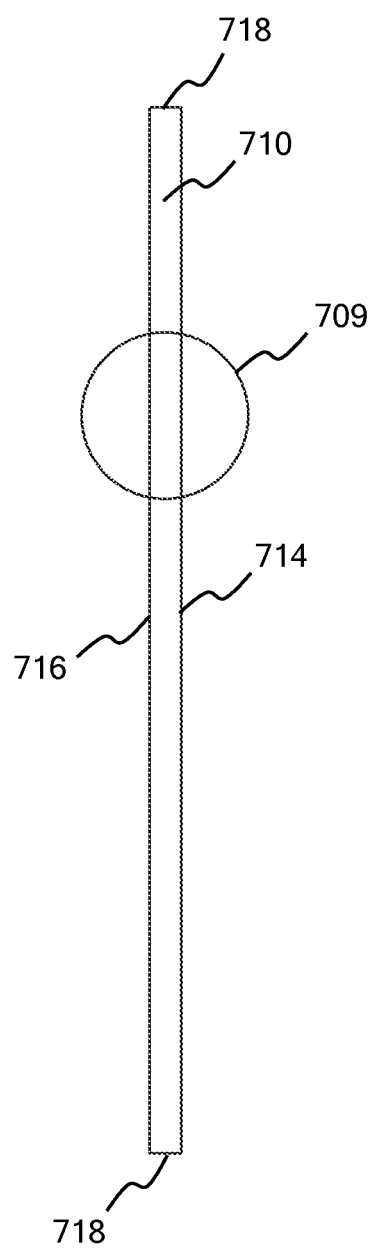
FIG. 23 shows a side view cross-section of construction board 710 of FIG. 22.

FIG. 22 shows a perspective view of an embodiment of construction board 710 separated from core 158. FIG. 23 shows a side view of construction board 710 of FIG. 22. In this embodiment construction board 710 covers a portion of core 158, and comprises the elements of coating 160 that covers surface 124 of core 158, as shown in FIG. 3 and FIG. 8 through FIG. 10, but in dry mixture form. In this embodiment construction board 710 is applied to core 158 using a suction bond adhesion material, but it is to be understood that construction board 710 can be applied to core 158 using any coupling means. In this embodiment construction board 710 is applied to core 158 using a suction bond adhesion material that is an elastomeric acrylic polymer bonder mixture.

Construction board 710 can be formed to include any or all of the layers previously described for coating 160 or coating 560. Once construction board 710 is applied to core 158 to form building panel 112, building panel 112 formed using dry mixture construction board 710 has the same structural and protection characteristics as building panel 112 that uses coating 160 or 560 that are applied while they are wet mixtures. Construction board 710 has the same or similar thickness as the thickness of coating 160 or coating 560 has. In some embodiments the thickness of construction board 710 is less than or equal to 1 inch. In some embodiments the thickness of construction board 710 is less than or equal to ¾ inch. In some embodiments the thickness of construction board 710 is less than or equal to ½ inch.

FIG. 24 through FIG. 31 show examples of the layers of material forming some embodiments of construction board 710. It is to be understood that construction board 710 can include any of the layers described earlier regarding coating 160 and coating 560, or any other layers included in coating 160 or coating 560 according to the invention. The details shown in the example embodiments are examples only and not meant to be limiting.

Figure 24:
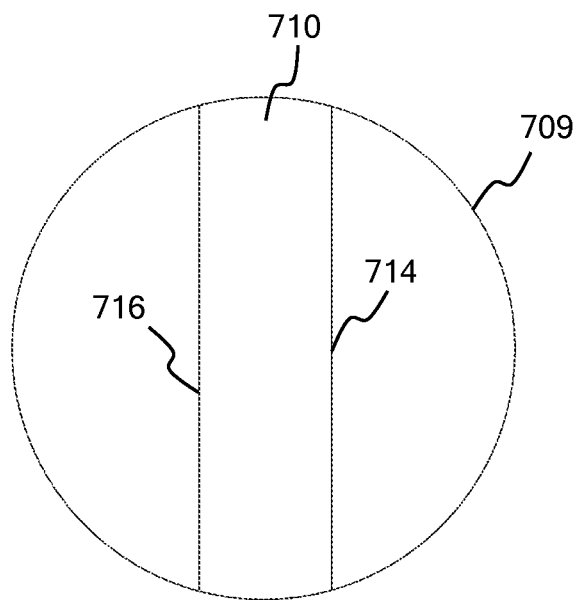
FIG. 24 shows a close-up of section 709 of FIG. 23, showing one cross-section embodiment of construction board 710. In this embodiment construction board 710 is one layer of material.

In some embodiments, construction board 710 has a single layer, as shown in FIG. 24. Construction board 710 in this embodiment can include any of the elements, materials, mixtures, layers, or structures described above for coating 160 of FIG. 11. In some embodiments construction board 710 includes a single layer that is a mixture of cement, acrylic bonder, aggregate, and ceramic. In some embodiments the aggregate in construction board 710 includes the ceramic material. In some embodiments construction board 710 includes a single layer that includes fiberglass strands. In some embodiments construction board 710 includes a single layer that includes a fiberglass mesh. In some embodiments construction board 710 includes a single layer that includes an electronic mesh structure layer. In some embodiments construction board 710 includes a single layer that includes ceramic.

Figure 25:
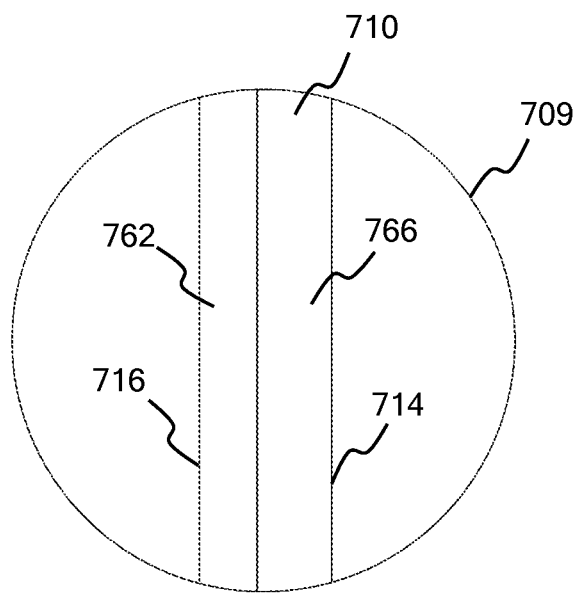
FIG. 25 shows a close-up of section 709 of FIG. 23, showing a further cross-section embodiment of construction board 710. In this embodiment construction board 710 is formed of first layer 762 and second layer 766.
Figure 26:
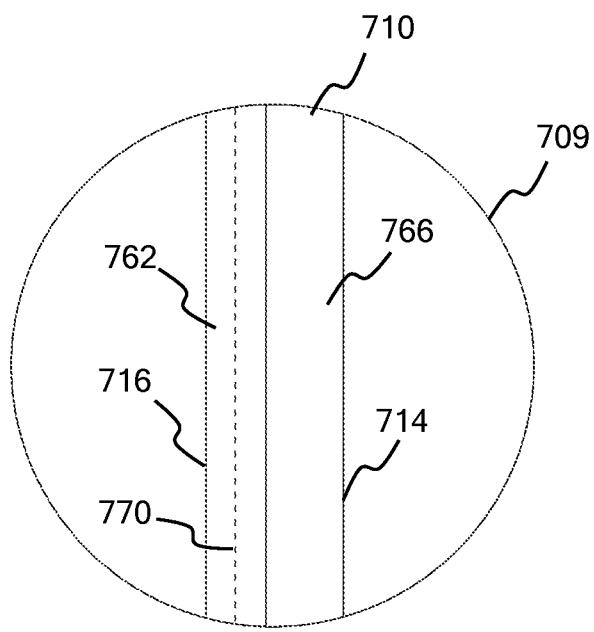
FIG. 26 shows a close-up of section 709 of FIG. 23, showing a further cross-section embodiment of construction board 710. In this embodiment of construction board 710, first layer 762 includes reinforcing mesh structure 770.
Figure 27:
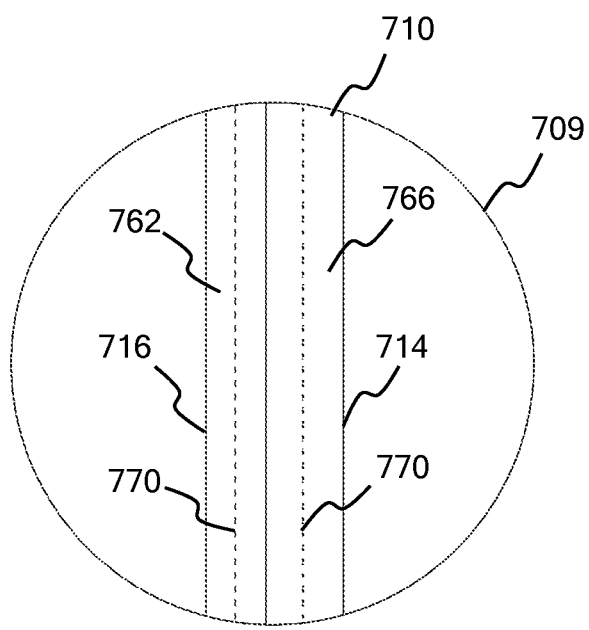
FIG. 27 shows a close-up of section 709 of FIG. 23, showing a further cross-section embodiment of construction board 710. In this embodiment of construction board 710, first layer 762 and second layer 766 includes reinforcing mesh structure 770.

In some embodiments, construction board 710 has two layers, first layer 762 and second layer 766, as shown in FIG. 25. Construction board 710 in this embodiment can include any of the elements, materials, mixtures, layers, or structures described above for coating 160 and first layer 162 and second layer 166 of FIG. 12. In some embodiments first layer 762 includes cement, aggregate, and acrylic bonder. In some embodiments first layer 762 includes a reinforcing mesh structure such as fiberglass mesh, cotton mesh, metal mesh, Kevlar mesh, or other type of reinforcing mesh structure, as shown in FIG. 26. First layer 762 can include any or all of the components described with respect to layers 162, 166, 562, or 566 discussed earlier. In some embodiments both first layer 762 and second layer 766 includes a reinforcing mesh structure such as fiberglass mesh, cotton mesh, metal mesh, Kevlar mesh, or other type of reinforcing mesh structure, as shown in FIG. 27.

In some embodiments second layer 766 includes cement, aggregate, and acrylic bonder. In some embodiments the aggregate includes ceramic. In some embodiments second layer 766 includes cement and acrylic bonder. In some embodiments second layer 766 includes cement, acrylic bonder, and a reinforcing mesh structure. In some embodiments second layer 762 includes a reinforcing mesh structure such as fiberglass mesh, cotton mesh, metal mesh, Kevlar mesh, or other type of reinforcing mesh structure, as shown in FIG. 27. Second layer 766 can include any or all of the components described with respect to layers 162, 166, 562, or 566 discussed earlier.

Figure 28:
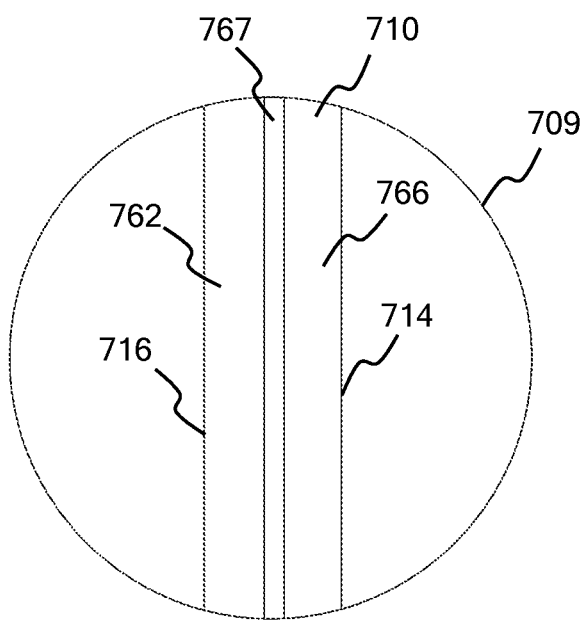
FIG. 28 shows a close-up of section 709 of FIG. 23, showing a further cross-section embodiment of construction board 710. In this embodiment construction board 710 includes first layer 762, second layer 766, and non-cementitious layer 767.
Figure 29:
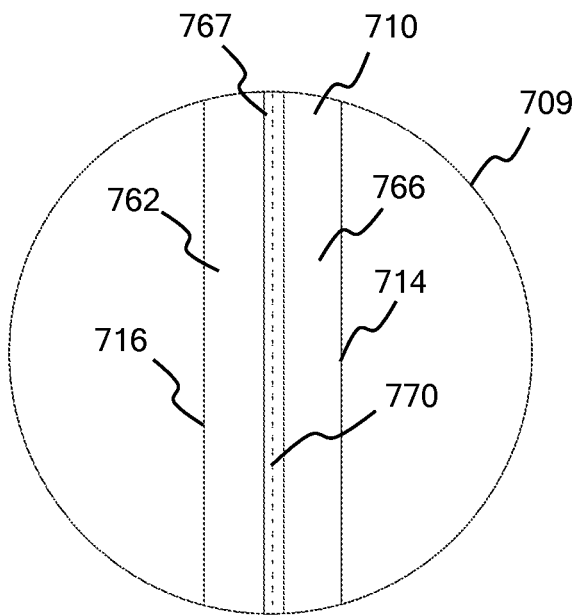
FIG. 29 shows a close-up of section 709 of FIG. 23, showing a further cross-section embodiment of construction board 710. In this embodiment construction board 710 includes first layer 762, second layer 766, and non-cementitious layer 767, where non-cementitious layer 767 includes reinforcing mesh structure 770.

In some embodiments construction board 710 includes non-cementitious layer 767, as shown in FIG. 28. In some embodiments non-cementitious layer 767 is ceramic. In some embodiments non-cementitious layer 767 is a lead layer. In some embodiments non-cementitious layer 767 is a carbon nanostructure layer. In some embodiments non-cementitious layer 767 is a projectile-resistant layer. In some embodiments non-cementitious layer 767 is an electronic mesh structure. In some embodiments non-cementitious layer 767 includes a reinforcing mesh, as shown in FIG. 29. Construction board 710 can have any of the components or characteristics described earlier with regard to coating 160 of FIG. 14 and FIG. 15.

Construction board 710 can have interdigitated layers, as described earlier with regard to coating 560. Construction board 710 can include any of the layers, structures, peaks, valleys, mixtures, and elements described earlier with respect to coating 560 of FIG. 17 through FIG. 21.

Figure 30:
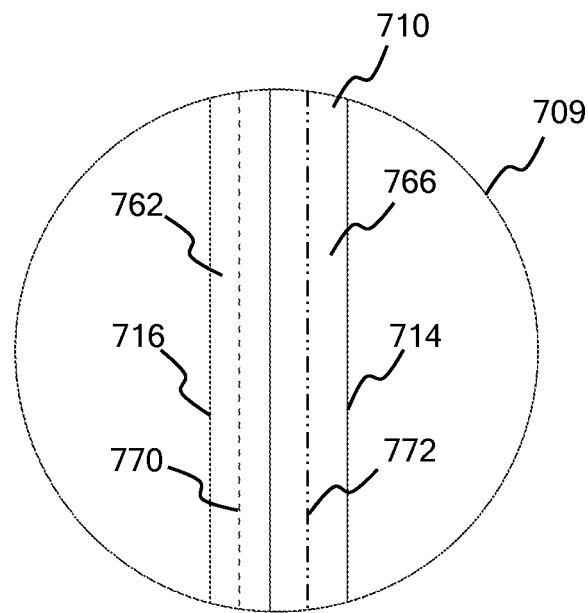
FIG. 30 shows a close-up of section 709 of FIG. 23, showing a further cross-section embodiment of construction board 710. In this embodiment of construction board 710, second layer 766 includes electronic mesh structure 772.

In some embodiments construction board 710 includes electronic mesh structure 772, as shown in FIG. 30. Electronic mesh structure 772 can be in any layer of construction board 710. In some embodiments electronic mesh structure 772 is in first layer 762. In some embodiments electronic mesh structure 772 is in second layer 766 (as seen in FIG. 30). In some embodiments electronic mesh structure 772 is coupled to inner surface 716 of construction board 710. In some embodiments electronic mesh structure 772 is coupled to outer surface 714 of construction board 710. In some embodiments electronic mesh structure 772 is between layers of construction board 710. Electronic mesh structure can be in or between any layers or on any surface of construction board 710. Electronic mesh structure 772 can have any of the characteristics described earlier with respect to electronic mesh structure 172.

Figure 31:
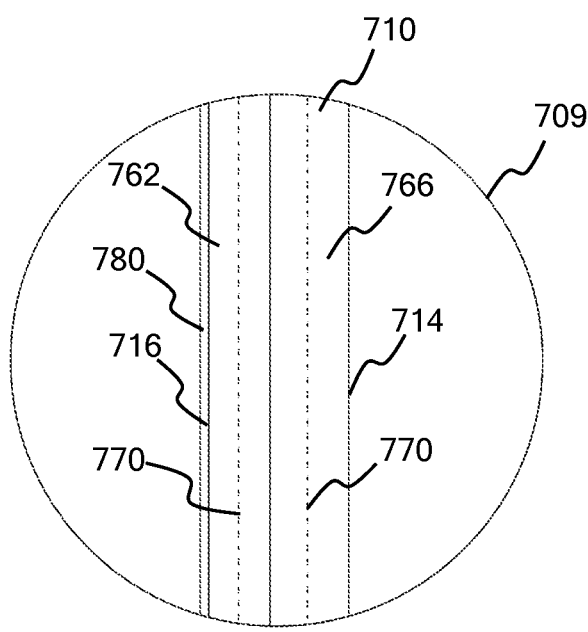
FIG. 31 shows a close-up of section 709 of FIG. 23, showing a further cross-section embodiment of construction board 710. In this embodiment of construction board 710, inner surface 716 is coupled to construction film 780.

In some embodiments construction board 710 includes construction film 780, as shown in FIG. 31. Construction film 780 is any film that is adhered or coupled to a surface on construction board 710 for any reason. Construction film 780 can have many different purposes, including to protect surfaces of construction board 710 during forming and shipping, to act as a barrier between different layers or a barrier within building panel 112, or to provide specific materials for adhesion or forming of a layer of construction board 710 or building panel 112. In the embodiment shown in FIG. 31, construction film 780 is coupled to inner surface 716 of construction board 710. In this embodiment construction film 780 is moisture barrier 780 that protects building panel 112 from absorbing or passing moisture once construction board 710 is applied to core 158. In some embodiments construction film 780 is electronic mesh structure 772 that attenuates electromagnetic waves of a particular frequency that attempt to pass through electronic mesh structure 772. The electronic mesh structures 772 of adjacent building panels 112 can be electrically coupled to create an electronic shield around structure 110 that protects the interior of structure 110 from certain electromagnetic waves, pulses, or energy. In some embodiments construction film 780 is electronic antenna 780 that amplifies electromagnetic waves of a particular frequency that attempt to pass through electronic antenna 780. In some embodiments construction film 780 is electronic mesh structure 772 that includes electronic conductors, insulators, resistors, inductors, capacitors, semiconductor chips, microprocessors, or any other electronic element, giving building panel 112 the ability to perform certain electronic processes, conduct electricity, and transmit energy from one building panel 112 to another.

It is to be understood that additional layers can be added to building panel 112 or construction board 710 if desired to add capabilities, strength, protection or aethitic qualities to building panel 110 or construction board 710.

Figure 32:
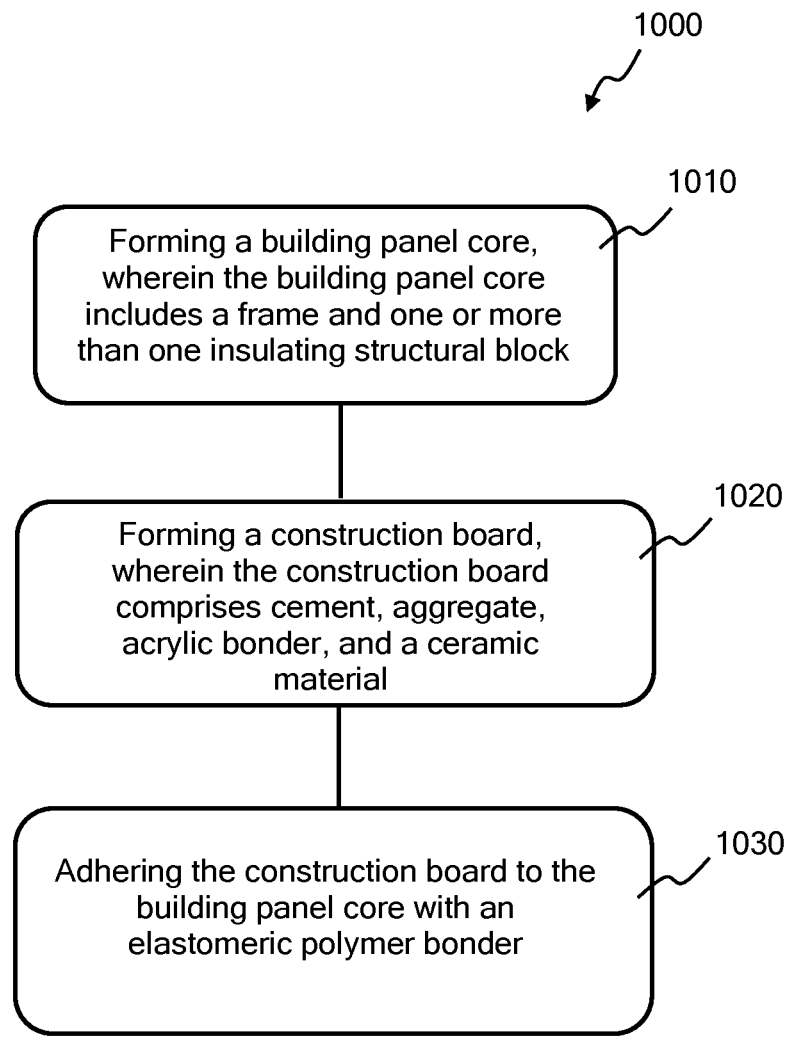
FIG. 32 illustrates method 1000 of forming a building panel according to the invention.

FIG. 32 illustrates method 1000 of forming a building panel according to the invention. Method 1000 according to the invention includes step 1010 of forming a building panel core, where the building panel core includes a frame and one or more than one insulating structural block. Method 1000 according to the invention also includes step 1020 of forming a construction board, where the construction board comprises cement, aggregate, acrylic bonder, and ceramic. Method 1000 according to the invention also includes step 1030 of adhering the construction board to the building panel core with an elastomeric polymer bonder. Method 1000 according to the invention of forming a building panel can include many other steps. In some embodiments method 1000 includes the step of coupling the building panel to another building panel to form a building panel structure. In some embodiments method 1000 includes the step of applying a coating to the construction board.

Step 1010 of forming a building panel core according to the invention can include many other steps. In some embodiments step 1010 includes the step of applying coating 160 to a portion of the one or more than one insulating structural block. In some embodiments step 1010 includes the step of applying coating 560 to a portion of the one or more than one insulating structural block. In some embodiments step 1010 includes the step of applying a coating to a portion of the one or more than one insulating structural block. In some embodiments step 1010 includes the step of applying an acrylic bonder to a portion of the one or more than one insulating structural block.

Step 1020 of forming construction board according to the invention can include many other steps. In some embodiments step 1020 includes the step of applying coating 160 to a construction film. In some embodiments step 1020 includes the step of allowing coating 160 to dry. In some embodiments step 1020 includes the step of applying coating 560 to a construction film. In some embodiments step 1020 includes the step of allowing coating 560 to dry. Step 1020 can include any of the steps involved in applying coating 160 or coating 560 described earlier. In some embodiments step 1020 includes allowing the layers of construction board 710 to dry.

Step 1030 of adhering the construction board to the building panel according to the invention can include many other steps. In some embodiments step 1030 includes adhering an electronic mesh structure to the construction board. In some embodiments step 1030 includes adhering the construction board to the building panel with acrylic bonder.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A building panel comprising:
    a building panel core, wherein the building panel core comprises a frame and one or more than one insulating structural block; and
    a coating covering a portion of the building panel core, wherein the coating comprises:
        a scratch layer, wherein the scratch layer comprises:
            a first scratch layer comprising a cementitious mixture and a reinforcing Mesh; and
            a second scratch layer covering a portion of the first scratch layer, wherein the second scratch layer comprises a cementitious mixture and a plurality of crests and valleys formed in the cementitious mixture; and
        a main brown layer comprising a cementitious mixture and a reinforcing mesh, wherein the main brown layer covers the plurality of crests and valleys of the second scratch layer.

2. The building panel of claim 1, wherein the plurality of crests have an average half-width of between ½ inch and ¾ inch after the second scratch layer cures.

3. The building panel of claim 1, wherein the main brown layer further comprises acrylic bonder, reinforcing strands, and aggregate.

4. The building panel of claim 3, wherein the first scratch layer comprises acrylic bonder, reinforcing strands, and aggregate.

5. The building panel of claim 4, wherein:
    the second scratch layer is a mixture of cement, aggregate, acrylic bonder, and a fiberglass mesh.

6. The building panel of claim 5, wherein the main brown layer further comprises ceramic.

7. The building panel of claim 1, wherein the plurality of crests have an average height of between ¼ inch and ¾ inch after the second scratch layer cures.

8. The building panel of claim 7, wherein the plurality of valleys have an average height above the first scratch layer of at least 3/16 inches.

9. The building panel of claim 1, wherein the main brown layer comprises an electronic mesh structure.

10. The building panel of claim 1, wherein the main brown layer comprises carbon nanotubes.

11. The building panel of claim 1, wherein the first scratch layer comprises a metal mesh that is a part of an electronic processing structure.

12. The building panel of claim 1, wherein the first scratch layer comprises a metal mesh that is electrically coupled to an electronic processor.

13. The building panel of claim 1, wherein the second scratch layer comprises carbon fibers.

14. The building panel of claim 1, wherein the second scratch layer forms an anechoic structure.

* * * * *